(12) United States Patent
Miyagi

(10) Patent No.: US 8,259,355 B2
(45) Date of Patent: Sep. 4, 2012

(54) IMAGE PROCESSING DEVICE, IMAGE PROCESSING METHOD, IMAGE FORMING APPARATUS, AND STORAGE MEDIUM

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 857 days.

(21) Appl. No.: 12/318,849

(22) Filed: Jan. 9, 2009

(65) Prior Publication Data

US 2009/0180164 A1    Jul. 16, 2009

(30) Foreign Application Priority Data

Jan. 15, 2008    (JP) .................................. 2008-005444

(51) Int. Cl.
G06K 15/00    (2006.01)
G06K 9/34    (2006.01)
G06F 3/12    (2006.01)

(52) U.S. Cl. .......................... 358/2.1; 382/164; 358/1.13

(58) Field of Classification Search .................. None
See application file for complete search history.

(56) References Cited

U.S. PATENT DOCUMENTS

| | | | |
|---|---|---|---|
| 6,061,470 A * | 5/2000 | Kiyohara | ....................... 382/164 |
| 7,327,874 B2 | 2/2008 | Shibaki et al. | |
| 7,356,160 B2 | 4/2008 | Miyagi et al. | |
| 7,403,310 B2 | 7/2008 | Miyagi et al. | |
| 2003/0058465 A1 | 3/2003 | Miyagi et al. | |
| 2003/0095287 A1 | 5/2003 | Miyagi et al. | |
| 2004/0114815 A1 | 6/2004 | Shibaki et al. | |
| 2004/0165081 A1 | 8/2004 | Shibaki et al. | |
| 2004/0165747 A1 | 8/2004 | Shibaki et al. | |
| 2004/0252316 A1 | 12/2004 | Miyagi et al. | |
| 2004/0257622 A1 | 12/2004 | Miyagi et al. | |
| 2005/0018258 A1 | 1/2005 | Miyagi | |
| 2005/0018903 A1 | 1/2005 | Miyagi et al. | |
| 2005/0207661 A1 | 9/2005 | Miyagi et al. | |
| 2006/0187246 A1 | 8/2006 | Miyagi et al. | |
| 2006/0256123 A1 | 11/2006 | Miyagi | |
| 2006/0274332 A1 | 12/2006 | Miyagi | |
| 2007/0177180 A1 * | 8/2007 | Yamada et al. | .............. 358/1.13 |
| 2007/0206228 A1 | 9/2007 | Miyagi | |
| 2008/0144975 A1 | 6/2008 | Shibaki et al. | |

FOREIGN PATENT DOCUMENTS

| | | |
|---|---|---|
| JP | 08-328788 | 12/1996 |
| JP | 2001-352454 | 12/2001 |
| JP | 2002-023970 | 1/2002 |
| JP | 2005-094397 | 4/2005 |

OTHER PUBLICATIONS

Japanese Office Action dated Mar. 23, 2012, issued in for corresponding Application No. 2008-005444.

* cited by examiner

*Primary Examiner* — Twyler Haskins
*Assistant Examiner* — Barbara Reinier
(74) *Attorney, Agent, or Firm* — Harness, Dickey & Pierce, P.L.C.

(57) ABSTRACT

A device for converting a color image including multiple character images into a monochrome image is disclosed. The device includes a color conversion unit configured to reduce the image density of black character images included in the color image to a level lower than the image density of specific color character images included in the color image and having a specific color other than black during the conversion of the color image into the monochrome image.

13 Claims, 21 Drawing Sheets

FIG.6

| COLOR | RGB | | | YIQ | | |
|---|---|---|---|---|---|---|
| | R/255 | G/255 | B/255 | Y/255 | I/255 | Q/255 |
| BLACK | 0 | 0 | 0 | 0 | 0 | 0 |
| RED (r) | 1 | 0 | 0 | 0.30 | 0.60 | 0.21 |
| MAGENTA (m) | 1 | 0 | 1 | 0.41 | 0.28 | 0.52 |
| BLUE (b) | 0 | 0 | 1 | 0.11 | −0.32 | 0.31 |
| CYAN (c) | 0 | 1 | 1 | 0.70 | −0.60 | −0.21 |
| GREEN (g) | 0 | 1 | 0 | 0.59 | −0.28 | −0.52 |
| YELLOW (y) | 1 | 1 | 0 | 0.89 | 0.32 | −0.31 |

FIG.18

COL DATA TABLE

| FONT | SIZE | ITALIC | UNDERLINE | BOLDFACE |
|------|------|--------|-----------|----------|
| MINCHO | 10pt | OFF | OFF | ON |

BK DATA TABLE

| | FONT | SIZE | ITALIC | UNDERLINE | BOLDFACE |
|---|------|------|--------|-----------|----------|
| ① | MINCHO | 10pt | OFF | OFF | OFF |
| ② | MINCHO | 14pt | OFF | OFF | OFF |
| ③ | MINCHO | 10pt | ON | OFF | OFF |
| ④ | GOTHIC | 10pt | OFF | OFF | OFF |

JUDGE DATA TABLE

| FONT | SIZE | ITALIC | UNDERLINE | BOLDFACE |
|------|------|--------|-----------|----------|
| MINCHO | 10pt | ON | OFF | OFF |

Review meeting for XXX will be held on :July 20 (Monday):.
Your participation is requested.

FIG.22

Review meeting for XXX will be held on :July 20 (Monday):.
Your participation is requested.

IMAGE PROCESSING DEVICE, IMAGE PROCESSING METHOD, IMAGE FORMING APPARATUS, AND STORAGE MEDIUM

BACKGROUND OF THE INVENTION

1. Field of the Invention

A certain aspect of the present invention relates to an image processing device, an image processing method, an image forming apparatus, and a storage medium storing program code for causing a computer to function as the image processing device.

2. Description of the Related Art

With a typical image processing device for converting a color image including character images into a monochrome image, characters drawn in colors other than black (hereafter called color characters) in an original color image are converted into pale gray characters that are less noticeable than black characters. With such an image processing device, characters emphasized by the creator of a color image may become less noticeable than other normal characters. For example, in a color image, normal characters are drawn in black and characters to be emphasized are drawn in colors such as red and blue to attract the attention of readers. If such a color image is converted into a monochrome image as described above, the color characters are converted into pale gray characters that are less noticeable than black characters.

Patent document 1 discloses an image processing device that changes character properties of color characters so that the color characters are, for example, underlined or italicized when they are converted into monochrome characters. The disclosed image processing device makes it possible to convert color characters into underlined, italicized, or boldfaced black characters and thereby to make them more noticeable than normal black characters even after the conversion.

[Patent document 1] Japanese Patent Application Publication No. 8-328788

Meanwhile, in some documents, character properties such as character decorations (e.g., underline), typefaces (e.g., italic and fonts), character sizes, and character thickness have special meanings. For example, in administrative documents and scientific papers, underlines attached to characters may indicate that the characters are modified and italic alphabetical characters may be used to represent scientific names in biological classification. If such documents are converted into monochrome images with an image processing device as disclosed in patent document 1, characters that have not been modified may be underlined and words other than scientific names may be italicized. This may result in giving wrong information to readers of the documents.

SUMMARY OF THE INVENTION

Aspects of the present invention provide an image processing device, an image processing method, an image forming apparatus, and a storage medium that solve or reduce one or more problems caused by the limitations and disadvantages of the related art.

An aspect of the present invention provides a device for converting a color image including multiple character images into a monochrome image. The device includes a color conversion unit configured to reduce the image density of black character images included in the color image to a level lower than the image density of specific color character images included in the color image and having a specific color other than black during the conversion of the color image into the monochrome image.

BRIEF DESCRIPTION OF THE DRAWINGS

FIG. 6 is a table showing the correspondence between RGB color signal values and YIQ color signal values;

FIG. 18 is a drawing illustrating exemplary data tables stored in a data storage unit of a character color mix determination unit of a copier according to a third embodiment of the present invention;

FIG. 21 is a drawing illustrating a first exemplary original color image;

FIG. 22 is a drawing illustrating a monochrome image obtained by converting the first exemplary original color image by the copier of the third embodiment;

DESCRIPTION OF THE PREFERRED EMBODIMENTS

Preferred embodiments of the present invention are described below with reference to the accompanying drawings.

First Embodiment

An electrophotographic copier is described below as an example of an image forming apparatus according to a first embodiment of the present invention.

Figure 1:
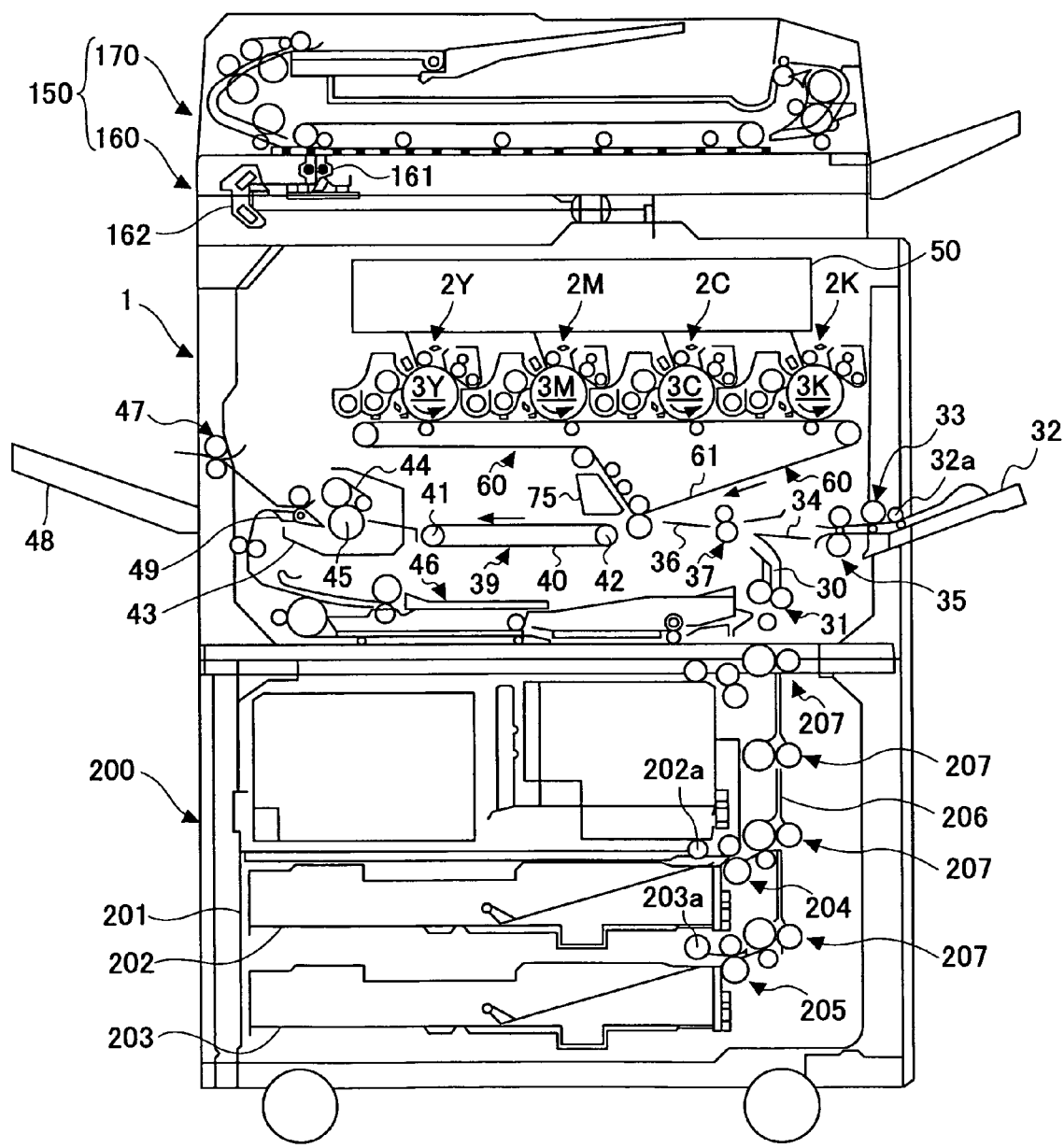
FIG. 1 is a schematic diagram of a copier according to a first embodiment of the present invention.

First, basic configurations of the copier of the first embodiment are described. FIG. 1 is a schematic diagram illustrating the copier of this embodiment. The copier includes a printing unit 1 used as an image forming unit, a paper-feed unit 200, and a document feeding/scanning unit 150.

The document conveying/scanning unit 150 includes a scanner 160 mounted on the printing unit 1 and used as a document scanning unit, and an ADF 170 supported on the scanner 160 and used as a document feeding unit.

The paper feed unit 200 includes a paper bank 201, two paper-feed cassettes 202 and 203 stacked in the paper bank 201, two separating roller pairs 204 and 205, a paper-feed path 206, and plural conveying roller pairs 207. The paper-feed cassettes 202 and 203, respectively, contain stacked recording sheets (not shown). When a feeding roller 202a or a feeding roller 202b is rotated according to a control signal from the printing unit 1, recording sheets are fed from the stack toward the paper-feed path 206. The recording sheets are separated one by one by the separating roller pair 204 or 205 and fed into the paper-feed path 206. The separated recording sheet is conveyed through the conveying nips of the conveying roller pairs 207 in the paper-feed path 206 into a first guiding path 30 of the printing unit 1.

The printing unit 1 includes four process units 2C, 2M, 2Y, and 2K that, respectively, form yellow (Y), magenta (M), cyan (C), and black (K) toner images. The printing unit 1 also includes the first guiding path 30, a conveying roller pair 31, a manual feed tray 32, a separating roller pair 33, a second guiding path 34, a conveying roller pair 35, a before-transfer conveying path 36, a resist roller pair 37, a conveyor belt unit 39, a fusing unit 43, a switchback unit 46, a paper-ejecting roller pair 47, a paper catch tray 48, a switching claw 49, an optical scanning unit 50, and a transfer unit 60. The process units 2C, 2M, 2Y, and 2K include drum-shaped photoconductors 3C, 3M, 3Y, and 3K used as latent image carriers, respectively.

The before-transfer conveying path 36 is used to convey a recording sheet in a section leading to a secondary transfer nip described later. In the upstream of the before-transfer conveying path 36 with respect to the paper-conveying direction, the paper conveying path branches into the first guiding path 30 and the second guiding path 34. A recording sheet from the paper-feed path 206 of the paper-feed unit 200 goes into the first guiding path 30 and is fed into the before-transfer conveying path 36 through the conveying nip of the conveying roller pair 31 disposed in the first guiding path 30.

The manual feed tray 32 is attached to a side wall of the case of the printing unit 1 such that it can be opened and closed with respect to the case. When opened with respect to the case, recording sheets can be manually placed on the upper surface of the manual feed tray 32. The recording sheets are fed by a feeding roller 32a of the manual feed tray 32 toward the second guiding path 34. Then, the recording sheets are separated and fed one by one by the separating roller pair 33 into the second guiding path 34. The separated recording sheet is conveyed into the before-transfer conveying path 36 through the conveying nip of the conveying roller pair 35.

The optical scanning unit 50 includes laser diodes, a polygon mirror, and lenses (not shown). The optical scanning unit 50 drives the laser diodes according to image information obtained by the scanner 160 or sent from an external personal computer to scan the photoconductors 3C, 3M, 3Y, and 3K of the process units 2C, 2M, 2Y, and 2K. The photoconductors 3C, 3M, 3Y, and 3K of the process units 2C, 2M, 2Y, and 2K are rotated counterclockwise in FIG. 1 by a driving unit (not shown). The optical scanning unit 50 deflects laser beams in the rotational axis directions of the photoconductors 3C, 3M, 3Y, and 3K and thereby scans the photoconductors 3C, 3M, 3Y, and 3K. As a result, electrostatic latent images corresponding to C, M, Y, and K image components are formed on the corresponding photoconductors 3C, 3M, 3Y, and 3K.

Figure 2:
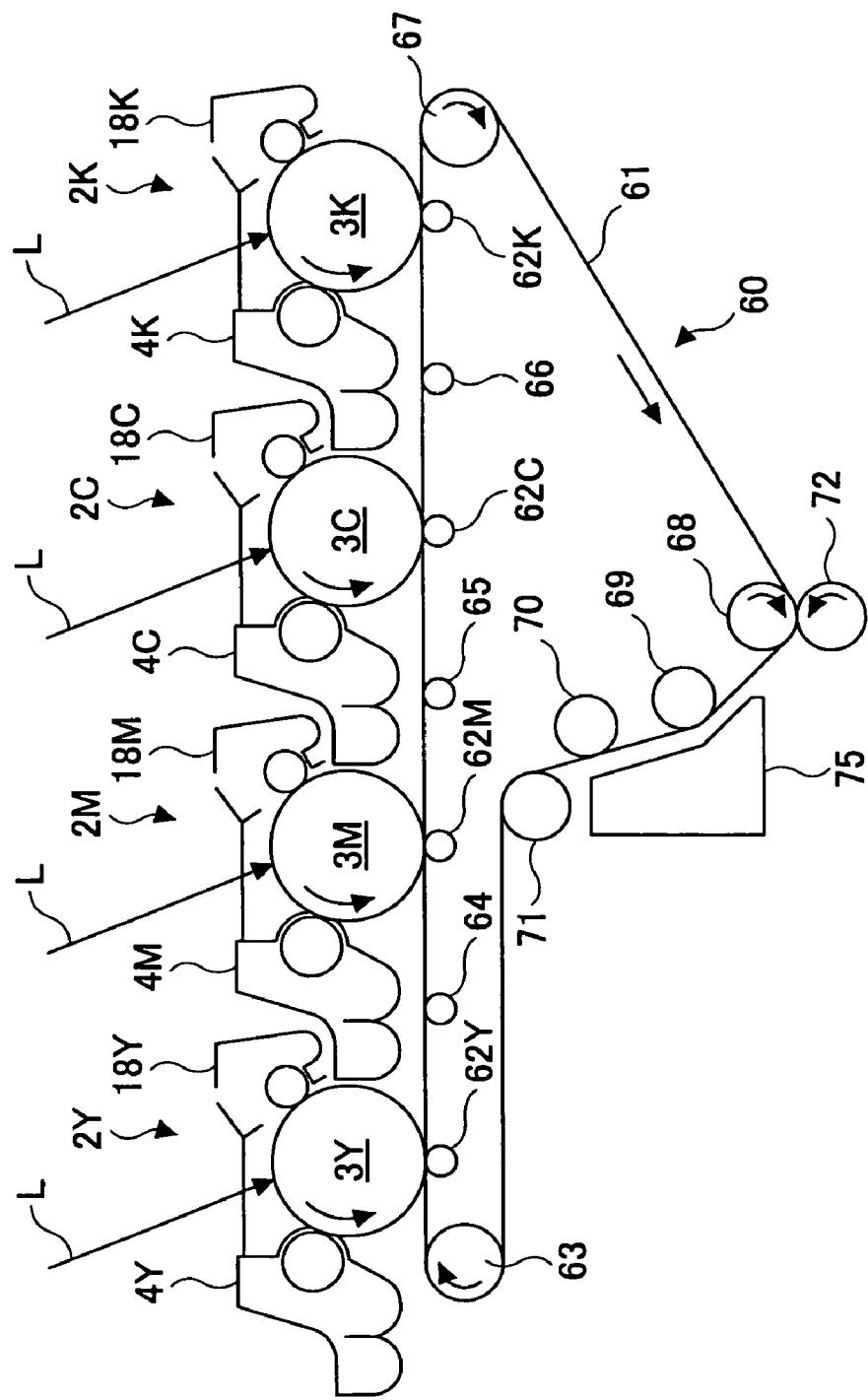
FIG. 2 is an enlarged view of a part of a printing unit of the copier shown in FIG. 1.

FIG. 2 is an enlarged view of a part of the printing unit 1. Each of the process units 2C, 2M, 2Y, and 2K includes a photoconductor used as a latent image carrier and other components disposed around the photoconductor that are supported on the same platform. The process units 2C, 2M, 2Y, and 2K are removably attached to the printer unit body. The process units 2C, 2M, 2Y, and 2K have substantially the same configuration except that they use toners of different colors. Take, for example, the process unit 2Y. The process unit 2Y includes the photoconductor 3Y and a developing device 4Y for developing an electrostatic latent image formed on the surface of the photoconductor 3Y to form a Y-toner image. The process unit 2Y also includes a drum cleaning unit 18Y for removing post-transfer residual toner adhering to the surface of the photoconductor 3Y after the photoconductor 3Y passes through a primary transfer nip for the Y component described later. The printing unit 1 of the copier of this embodiment is configured as a tandem image forming unit where four process units 2C, 2M, 2Y, and 2K are arranged along the rotational direction of an intermediate transfer belt 61 described later.

Figure 3:
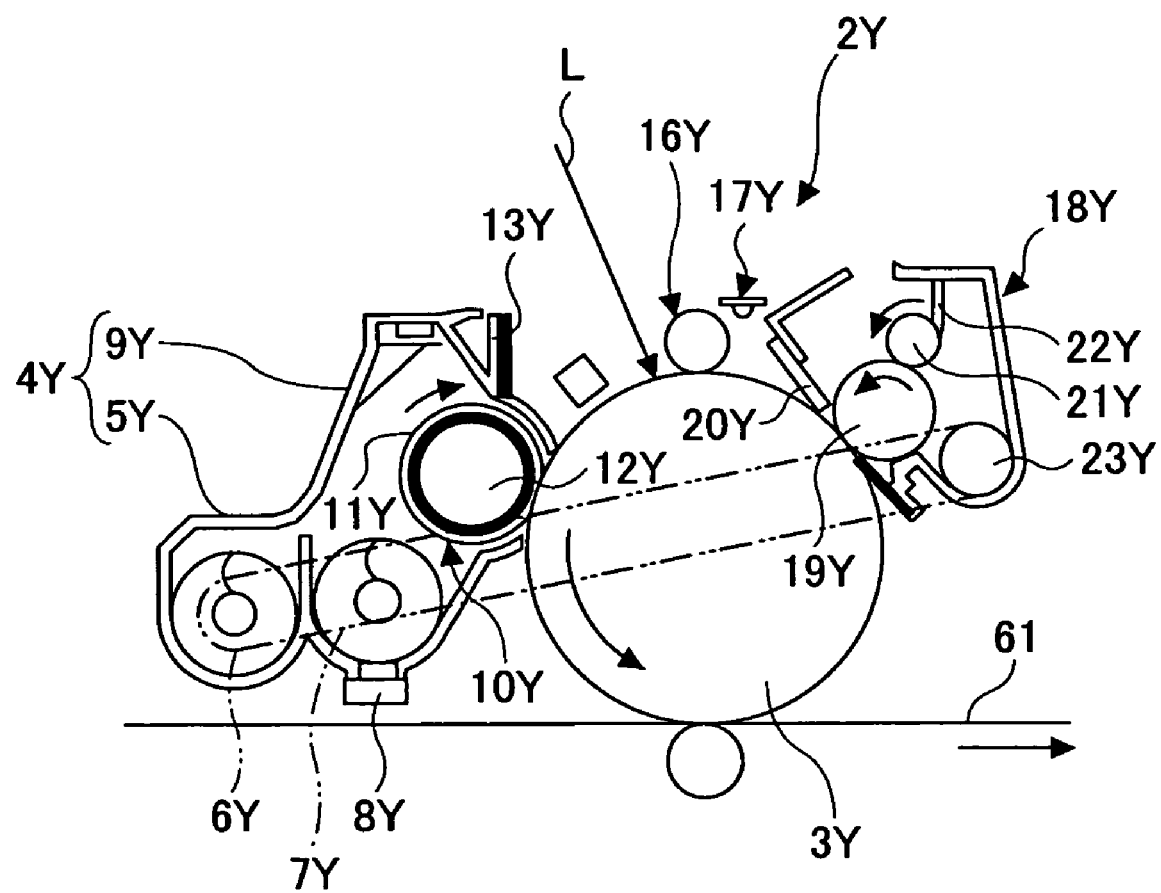
FIG. 3 is an enlarged view of a process unit for the Y component of the printing unit shown in FIG. 2.

FIG. 3 is an enlarged view of the process unit 2Y for the Y component. As shown in FIG. 3, the process unit 2Y includes the developing device 4Y, the drum cleaning unit 18Y, a discharge lamp 17Y, and a charging roller 16Y disposed around the photoconductor 3Y.

In this embodiment, the photoconductor 3Y is shaped like a drum and is made by forming a photosensitive layer on a base tube made of, for example, aluminum by applying an organic photosensitive material. Alternatively, a photoconductor shaped like an endless belt may be used.

The developing device 4Y uses a two-component developer (hereafter, simply called a developer) including magnetic carriers and nonmagnetic yellow toner. The developing device 4Y includes an agitating unit 5Y for agitating and conveying the developer contained in the developing device 4Y and a developing unit 9Y for developing an electrostatic latent image on the photoconductor 3Y. The developing device 4 may be configured to use a one-component developer including no magnetic carrier instead of a two-component developer.

The agitating unit 5Y is disposed lower than the developing unit 9Y and includes a first conveying screw 6Y and a second conveying screw 7Y that are disposed parallel to each other, a partition plate provided between the screws 6Y and 7Y, and a toner density sensor 8Y disposed on the bottom of the casing.

The developing unit 9Y includes a developing roller 10Y facing the photoconductor 3Y through an opening of the casing and a doctor blade 13Y having an edge positioned close to the developing roller 10Y. The developing roller 10Y includes a cylindrical developing sleeve 11Y made of a non-magnetic material and a magnet roller 12Y non-rotatably placed in the developing sleeve 12Y. The magnet roller 12Y has plural magnetic poles arranged along its circumference. The magnetic poles exert magnetic forces to the developer on the developing sleeve 12Y at the corresponding positions relative to the rotational direction. The magnetic forces attract the developer conveyed from the agitating unit 5Y to the surface of the developing sleeve 11Y and cause the developer to form a magnetic brush along the magnetic line of force on the surface of the developing sleeve 11Y.

The magnetic brush passes under the doctor blade 13Y as the developing sleeve 11Y rotates, is thereby reduced to a proper thickness, and is conveyed to a developing area facing the photoconductor 3Y. The yellow toner of the magnetic brush is transferred onto an electrostatic latent image on the photoconductor 3Y by the potential difference between the potential of the electrostatic latent image and a developing bias to be applied to the developing sleeve 11Y. Thus, the yellow toner develops the electrostatic latent image. The developer returns into the developing unit 9Y as the developing sleeve 11Y rotates, is released from the developing sleeve 11Y by a repulsive magnetic field formed between the magnetic poles of the magnet roller 12Y, and is thereby returned into the agitating unit 5Y. The toner density sensor 8Y in the agitating unit 5Y detects the density of toner in the developer and an appropriate amount of toner is supplied to the developer based on the detection result.

The drum cleaning unit 18Y of this embodiment includes a cleaning blade 20Y made of polyurethane rubber to be brought into contact with the photoconductor 3Y. A drum cleaning unit with a different configuration may also be used. In this embodiment, a fur brush 19Y is also provided to improve the cleaning-performance. The fur brush 19Y is rotatable in the direction of the arrow in FIG. 3 and is brought into contact with the photoconductor 3Y. The fur brush 19Y also scrapes lubricant from a solid lubricant (not shown), reduces the scraped lubricant to a fine powder, and applies the fine powder to the surface of the photoconductor 3Y.

Toner adhered to the fur brush 19Y is transferred onto an electric field roller 21Y being in contact with the fur brush 19Y and rotated in the counter direction. A bias is applied to the electric field roller 21Y. The toner transferred onto the electric field roller 21Y is scraped by a scraper 22Y and falls onto a collecting screw 23Y.

The collecting screw 23Y conveys the collected toner in a direction orthogonal to the plane of the printed page (of FIG. 3) to an external recycling unit (not shown). The recycling unit conveys the toner to the developing device 4Y for reuse.

The discharge lamp 17K illuminates and thereby discharges the photoconductor 3Y. The surface of the discharged photoconductor 3Y is uniformly charged by the charging roller 16Y and is then scanned by the optical scanning unit 50. The charging roller 16Y is rotated while being supplied with a charging bias from a power supply (not shown). Instead of the charging roller 16Y, a scorotron charger may be used. A scorotron charger charges a photoconductor without contact.

Through the above process, C, M, Y, and K toner images are formed on the surfaces of the photoconductors 3C, 3M, 3Y, and 3K of the process units 2C, 2M, 2Y, and 2K.

Referring back to FIG. 2, the transfer unit 60 is disposed below the process units 2C, 2M, 2Y, and 2K. The transfer unit 60 includes an endless intermediate transfer belt 61 stretched over multiple rollers. The intermediate transfer belt 61 is in contact with the photoconductors 3C, 3M, 3Y, and 3K and is rotated clockwise in FIG. 2 by the rotation of one of the rollers. With this configuration, primary transfer nips for the C, M, Y, K components are formed between the photoconductors 3C, 3M, 3Y, and 3K and the intermediate transfer belt 61.

Near the primary transfer nips for the C, M, Y, K components, the intermediate transfer belt 61 is pressed against the photoconductors 3C, 3M, 3Y, and 3K by primary transfer rollers 62C, 62M, 62Y, and 62K disposed inside of the belt loop. A primary transfer bias is applied to the respective primary transfer rollers 62C, 62M, 62Y, and 62K from a power supply (not shown). The primary transfer bias forms primary transfer electric fields at the primary transfer nips for the C, M, Y, K components. The primary transfer electric fields cause toner images on the photoconductors 3C, 3M, 3Y, and 3K to be electrostatically transferred onto the intermediate transfer belt 61.

As the intermediate transfer belt 61 rotates clockwise, the front surface of the intermediate transfer belt 61 passes through the primary transfer nips for the C, M, Y, K components in sequence. As a result, the toner images are transferred and superposed on the front surface of the intermediate transfer belt 61. In other words, a superposed toner image with four colors (hereafter called a four-color toner image) is formed on the front surface of the intermediate transfer belt 61.

In FIG. 2, a secondary transfer roller 72 is disposed below the intermediate transfer belt 61 and a secondary transfer backup roller 68 is disposed inside of the loop of the intermediate transfer belt 61. The secondary transfer roller 72 is in contact with the front surface of the intermediate transfer belt 61 at a position corresponding to the secondary transfer backup roller 68. With this configuration, a secondary transfer nip is formed between the front surface of the intermediate transfer belt 61 and the secondary transfer roller 72.

A secondary transfer bias is applied to the secondary transfer roller 72 by a power supply (not shown). Meanwhile, the secondary transfer backup roller 68 in the belt loop is grounded. With this configuration, a secondary transfer electric field is formed in the secondary transfer nip.

The resist roller pair 37 (see FIG. 1) is disposed on the right side of the secondary transfer nip. The resist roller pair 37 feeds a recording sheet to the secondary transfer nip in synchronization with the movement of the four-color toner image on the intermediate transfer belt 61. At the secondary transfer nip, the four-color toner image on the intermediate transfer belt 61 is caused to be transferred onto the recording sheet by the secondary transfer electric field and the nip pressure, and forms a full color image together with the white of the recording sheet.

After passing through the secondary transfer nip, toner that is not transferred onto the recording sheet remains on the front surface of the intermediate transfer belt 61 as post-transfer residual toner. The post-transfer residual toner is removed by a belt cleaning unit 75 that is in contact with the intermediate transfer belt 61.

Referring back to FIG. 1, the recording sheet passing through the secondary transfer nip is separated from the intermediate transfer belt 61 and is passed to the conveyor belt unit 39. The conveyor belt unit 39 includes a drive roller 41, a driven roller 42, and an endless conveyor belt 40 stretched over the drive roller 41 and the driven roller 42. The conveyor belt 40 is rotated counterclockwise in FIG. 1 by the rotation of the drive roller 41. The recording sheet passed from the intermediate transfer belt 61 is held on the upper surface of the rotating conveyor belt 40 and is conveyed to the fusing unit 43.

The fusing unit 43 includes a drive roller, a heating roller including a heat source, and an endless fusing belt 44 stretched over the drive roller and the heating roller. The fusing belt 44 is rotated clockwise by the rotation of the drive roller. The fusing unit 43 also includes a pressure roller 45 that is in contact with the lower surface of the fusing belt 44. The pressure roller 45 and the lower surface of the fusing belt 44 form a fusing nip. The recording sheet conveyed to the fusing unit 43 is pressed and heated to fuse the full color image to its surface. Then, the recording sheet is conveyed from the fusing unit 43 to the switching claw 49.

The switching claw 49 is caused to swing by a solenoid (not shown) to switch the conveying path of the recording sheet between an ejecting path and an inversion path. When the ejecting path is selected by the switching claw 49, the recording sheet fed from the fusing unit 43 passes through the ejecting path and the paper-ejecting roller pair 47 and is then ejected onto the paper catch tray 48.

The switchback unit 46 is disposed below the fusing unit 43 and the conveyor belt unit 39. When the inversion path is selected by the switching claw 49, the recording sheet fed from the fusing unit 43 passes through the inversion path, is thereby turned upside down, and is conveyed to the switchback unit 46. Then, the recording sheet is caused to pass through the second transfer nip again to transfer and fuse another image onto the other side of the recording sheet.

The scanner 160 mounted on the printing unit 1 is used as a scanning unit for scanning a document and includes a fixed scanning unit 161 and a movable scanning unit 162. The fixed scanning unit 161 includes a light source, reflection mirrors, and an imaging sensor such as a CCD. The fixed scanning unit 161 is disposed immediately below a first contact glass (not shown) that contacts a document and is fixed to the upper wall of the casing of the scanner 160. A document being conveyed by the AFD 170 over the first contact glass is illuminated by the light source. The light reflected by the document surface is received via the reflection mirrors by the imaging sensor. Thus, the fixed scanning unit 161 scans a document without moving an optical system including the light source and the reflection mirrors.

Meanwhile, the movable scanning unit 162 is disposed immediately below a second contact glass (not shown) that contacts a document and is fixed to the upper wall of the casing of the scanner 160. The movable scanning unit 162 is configured to be able to move an optical system including a light source and reflection mirrors from side to side in FIG. 1. The movable scanning unit 162 illuminates a document placed on the second contact glass with the light source by moving the optical system from side to side. The light reflected by the document surface is received via the reflection mirrors by an imaging sensor fixed to the scanner body. Thus, the movable scanning unit 162 scans a document by moving the optical system.

The copier of this embodiment includes a copy function for forming an image on a recording sheet with the printing unit 1 according to image information of a document scanned by the scanner 160 and also includes functions of a printer and a facsimile machine. The printing unit 1 includes a local area network (LAN) connector (not shown) and is able to communicate with a personal computer via a LAN cable connected to the LAN connector. Thus, the printing unit 1 is able to form an image on a recording sheet according to image information sent from a personal computer via the LAN cable and the LAN connector (print function). The printing unit 1 also includes a modem (not shown) and is able to transmit image information via a telephone line connected to the modem to a destination facsimile machine (facsimile function). The image information to be sent to the destination facsimile machine is, for example, obtained by scanning a document with the scanner 160. Also, the image information may be obtained from a personal computer via the LAN connector.

Next, a functional configuration of the copier of this embodiment is described.

Figure 4:
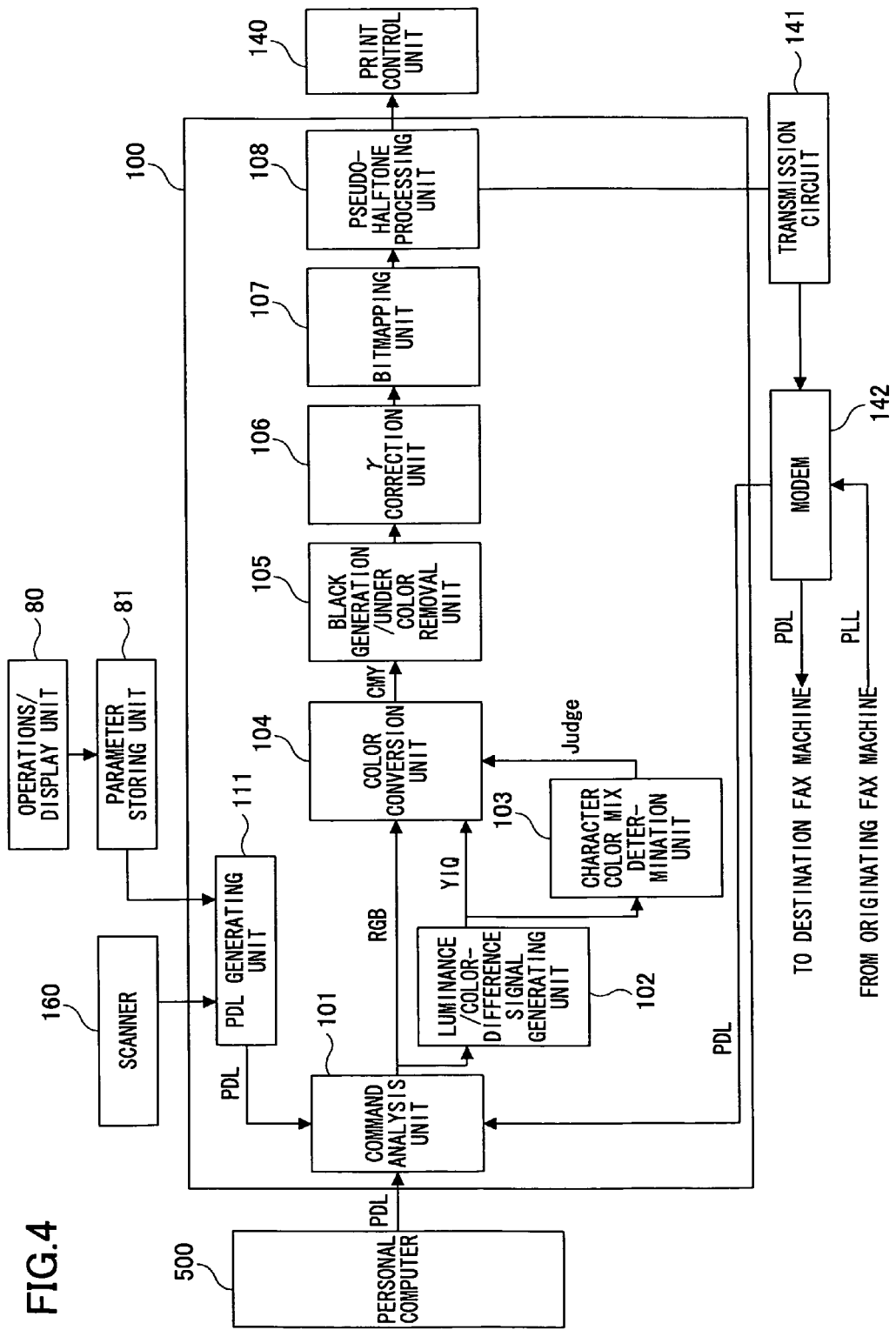
FIG. 4 is a block diagram illustrating an image processing device of the printing unit shown in FIG. 2 together with a scanner of the copier and an external personal computer.

FIG. 4 is a block diagram illustrating an image processing device 100 of the printing unit 1 of the copier of this embodiment together with the scanner 160 and an external personal computer 500. As shown in FIG. 4, the printing unit 1 includes, in addition to the components described above with reference to FIG. 1, an operations/display unit 80, a parameter storing unit 81, the image processing device 100, a print control unit 140, a transmission circuit 141, and a modem 142.

Image information obtained by scanning a document with the scanner 160 and image information sent from the personal computer 500 via the LAN cable are represented in a page description language (PDL) and are processed by the image processing device 100. The processed image information, for example, is used by the printing unit 1 to form an image or is sent via the transmission circuit 141, the modem 142, and a telephone line to a destination facsimile machine.

The operations/display unit 80 includes various key buttons and a liquid crystal display. When the key buttons are pressed by a user, the operations/display unit 80 stores control parameters corresponding to the pressed key buttons in the parameter storing unit 81 implemented, for example, by an IC memory. Control parameters provided by the copier of this embodiment include monochrome conversion ON/OFF information for turning on and off a monochrome conversion mode for converting color image information into monochrome image information. When a copy request or a fax transmission request is received, the copier refers to the monochrome conversion ON/OFF information stored in the parameter storing unit 81 and if the monochrome conversion mode is turned on, converts original color image information into monochrome image information. Then, the copier forms an image with the printing unit 1 according to the monochrome image information or sends the monochrome image information to a destination facsimile machine. Meanwhile, if the monochrome conversion mode is turned off, the copier forms a color image with the printing unit 1 according to the original color image information or sends the color image information to a destination facsimile machine.

Figure 5:
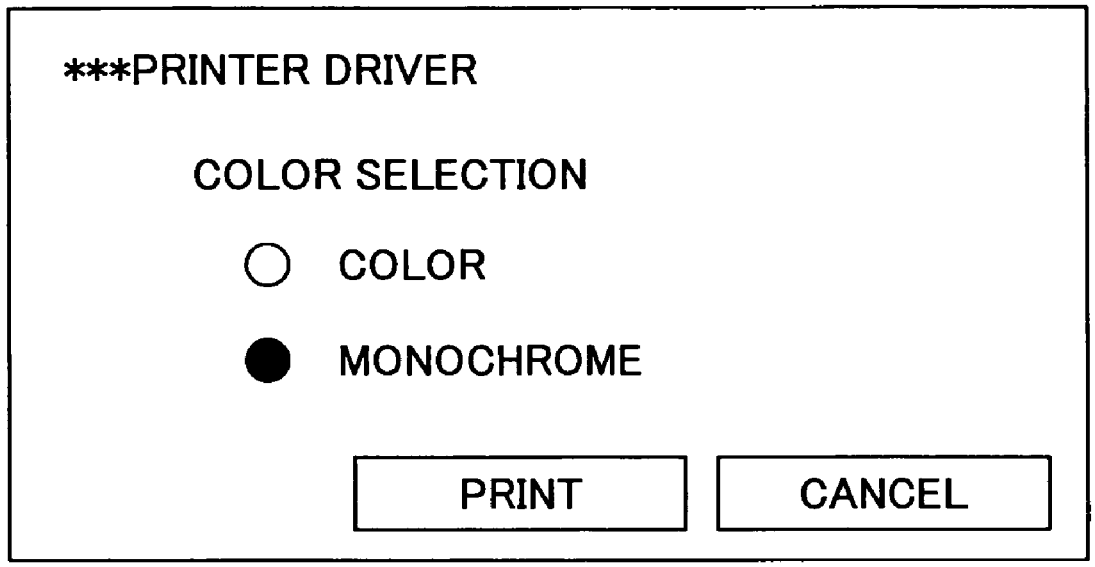
FIG. 5 is a schematic diagram illustrating a dialog box to be displayed by a printer driver for causing the copier to print an image.

The personal computer 500 is capable of converting information generated by application software into PDL data with, for example, a printer driver and of outputting the PDL data to an image forming apparatus such as a printer. When a print request is entered on application software, the printer driver displays a dialog box as shown in FIG. 5. This dialog box is used by a user to turn on or off the monochrome conversion mode. The dialog box includes radio buttons "color" and "monochrome" under a label "Color Selection". In FIG. 5, the "monochrome" radio button is selected. When a "Print" button in the dialog box is pressed with the "monochrome" radio button selected, original color image information is converted into monochrome image information and the monochrome image information is output by the printing unit 1 or sent to a destination facsimile machine. On the other hand, when the "Print" button in the dialog box is pressed with the "color" radio button selected, color image information with its original color tone is output by the printing unit 1 or sent to a destination facsimile machine. Thus, when the "color" radio button is selected, the monochrome conversion mode is turned off.

The image processing device 100 includes a command analysis unit 101, a luminance/color-difference signal generating unit 102, a character color mix determination unit 103, a color conversion unit 104, a black generation/under color removal unit 105, a γ correction unit 106, a bitmapping unit 107, a pseudo-halftone processing unit 108, and a PDL generating unit 111.

The PDL generating unit 111 generates PDL data based on image information obtained by scanning a document with the scanner 106 and outputs the PDL data to the command analysis unit 101. Thus, image information obtained by scanning a document with the scanner 106 is converted into PDL data and input to the command analysis unit 101. Meanwhile, PDL data sent from the external personal computer 500 or from a facsimile machine via a telephone line are input to the command analysis unit 101 without change.

The command analysis unit 101 analyzes commands in the PDL data. From draw commands in the PDL data, the command analysis unit 101 obtains object type information (document image, graphic-image, bitmap image, etc.), character properties, positions and sizes of objects, color signal values (values of red (R), green (G), and blue (B)), and the monochrome conversion ON/OFF information described above. The command analysis unit 101 outputs the above information to the color conversion unit 104 and also outputs the color signal values to the luminance/color-difference signal generating unit 102.

The luminance/color-difference signal generating unit 102 converts RGB color signal values of the respective objects into YIQ color signal values composed of a luminance signal value Y and color difference signal values I and Q. The command analysis unit 101 sends the RGB color signal values of the respective objects also to the color conversion unit 104. The YIQ color signal values (YIQ values) generated from the RGB color signal values (RGB values) by the luminance/color-difference signal generating unit 102 are used to convert color objects into monochrome objects in the monochrome conversion mode.

The RGB color signal values represent the luminance of R, G, and B with numbers from 0 to 255. In the RGB color model, black is represented by R=0, G=0, and B=0 as shown in FIG. 6. Also in the RGB color model, the palest red is represented by R=1, G=0, and B=0 as shown in FIG. 6.

The YIQ color signal values are composed of a Y value representing luminance, an I value representing color tones from orange to cyan, and a Q value representing other color tones. In the YIQ color model, the palest red is represented by Y=0.30, I=0.60, and Q=0.21 as shown in FIG. 6.

The correspondence between RGB values and YIQ values of black, palest red, palest magenta, palest blue, palest cyan, palest green, and palest yellow is shown in FIG. 6.

When converting RGB values of original color image information into YIQ values, a Y value can be obtained by the formula Y=0.30R+0.59G+0.11B. Similarly, an I value can be obtained by the formula I=0.60R−0.28G−0.32B, and a Q value can be obtained by the formula Q=0.21R−0.52G+0.31B. The luminance/color-difference signal generating unit 102 outputs the YIQ values generated as described above to the color conversion unit 104 and the character color mix determination unit 103.

When a grayscale signal (Gray) is also used to represent a color tone of an object, the signal is converted into YIQ values: Y=Gray, I=0, and Q=0. Although RGB values are converted into YIQ values in this embodiment, RGB values may be converted into color signal values in a different color model. For example, RGB values may be converted into color signal values of a Lab color model composed of a luminance component value L and two color component values a and b.

The character color mix determination unit 103 determines whether black characters and characters in specific colors other than black (specific color characters) are mixed in an original color image based on the YIQ values of all objects sent from the luminance/color-difference signal generating unit 102. In the copier of this embodiment, an R hue (red hue), an M hue (magenta hue), and a B hue (blue hue) are selected as specific colors by factory default (initial condition). These three colors are selected as the specific colors because they are most likely used to distinguish (emphasize) characters from other characters in an original color image.

Alternatively, only one of the R, M, and B hues may be selected as the specific color or any other color may be selected as the specific color. The copier of this embodiment is configured to allow the user to freely select specific colors using keys on the operations/display unit 80.

Figure 7:
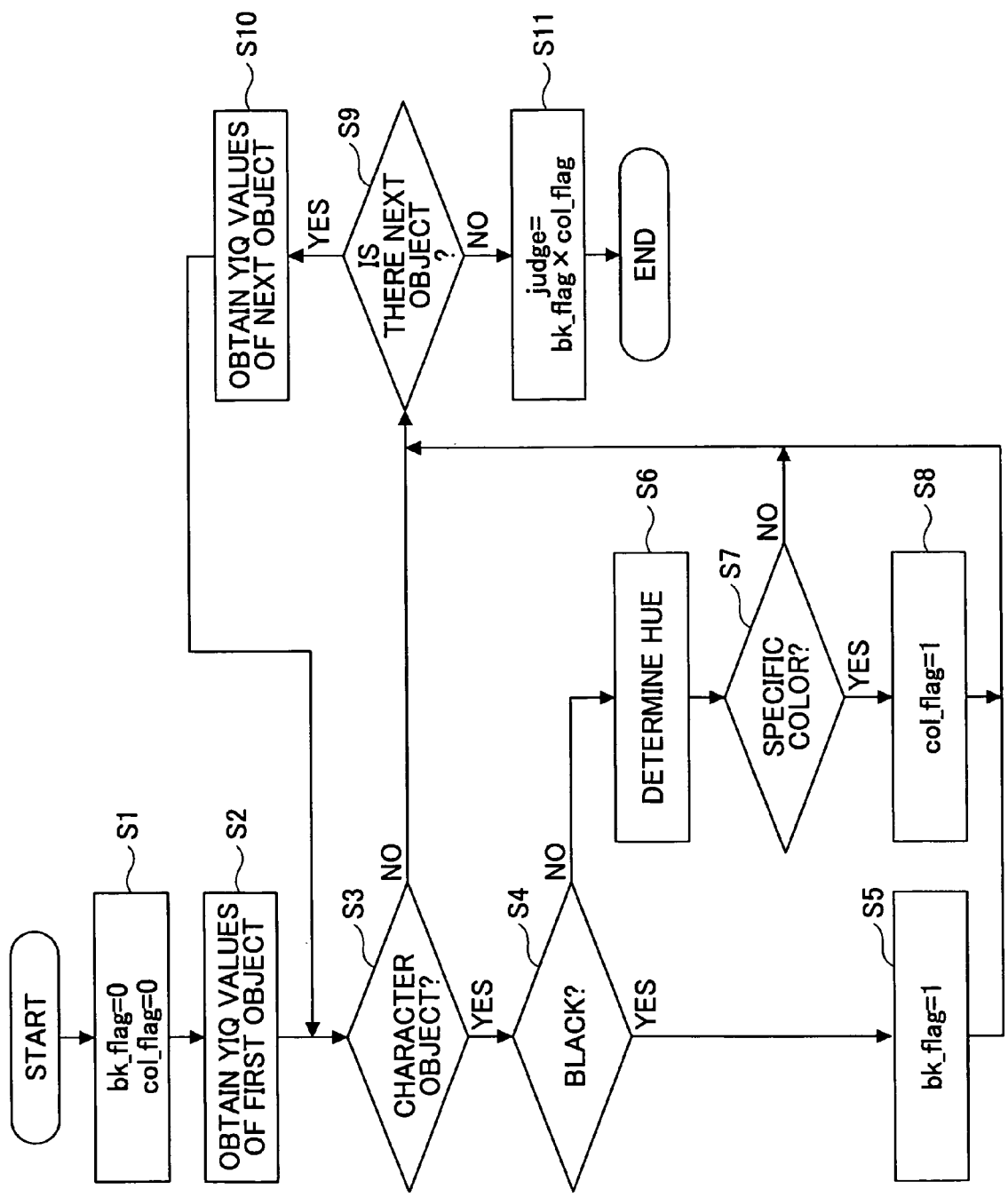
FIG. 7 is a flowchart showing a mix determination process performed by a character color mix determination unit of the copier.

FIG. 7 is a flowchart showing a mix determination process performed by the character color mix determination unit 103. First, the character color mix determination unit 103 sets parameters bk_flag and col_flag at 0 (step 1; hereafter, "step" is represented by "S"). The parameters bk_flag and col_flag are used to determine whether black characters and specific color characters are mixed. The parameter bk_flag is used to determine whether an original color image includes black characters. If the color image includes black characters, bk_flag is changed from 0 to 1. The parameter col_flag is used to determine whether an original color image includes specific color characters. If the color image includes specific color characters, col_flag is changed from 0 to 1.

The character color mix determination unit 103 obtains YIQ values of a first object in a color image (S2) and determines whether the object is a character (S3). If the object is not a character (NO in S3), the character color mix determination unit 103 determines whether there is a next object (S9). If there is a next object (YES in S9), the character color mix determination unit 103 obtains YIQ values of the next object (S10) and returns to step 3 to determine whether the next object is a character.

If the object is a character (YES in S3), the character color mix determination unit 103 determines whether the color of the character is black (S4). If the color is black (YES in S4), the character color mix determination unit 103 sets bk_flag at 1 and returns to step 9. Thus, if there is a next object, steps 10, 3, and 4 are repeated. If there is no next object, step 11 described later is performed.

Figure 8:
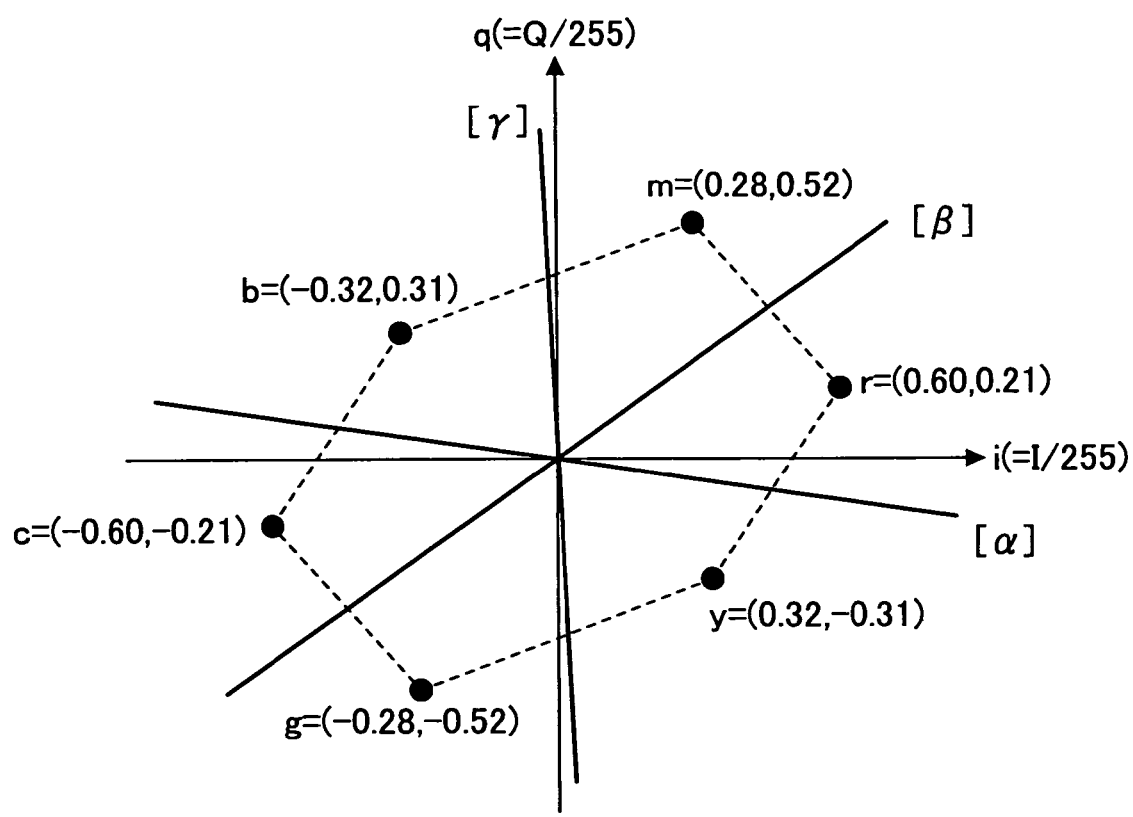
FIG. 8 is a graph showing an i-q coordinate system where IQ values of YIQ color signal values shown in FIG. 6 are plotted.

In step 4, if the color of the character is not black (NO in S4), the character color mix determination unit 103 determines the hue of the character (S6) as described below. FIG. 8 is a graph showing an i-q coordinate system where IQ values of YIQ color signal values shown in FIG. 6 are plotted. In the i-q coordinate system shown by the graph, dots y, r, m, b, c, and g represent IQ values corresponding to the palest yellow, red, magenta, blue, cyan, and green. A straight line [α] in the graph passes through the midpoint between the dots r and y and the midpoint between the dots b and c, and is represented by the formula $q=(-5/46)\times i$. A straight line [β] passes through the midpoint between the dots m and r and the midpoint between the dots c and g, and is represented by the formula $q=(73/88)\times i$. A straight line [γ] passes through the midpoint between the dots b and m and the midpoint between the dots g and y, and is represented by the formula $q=(-83/4)\times i$.

In the copier of this embodiment, hues are defined as described below. The R hue indicates colors the IQ values of which are plotted in an area formed between the straight lines [α] and [β] and including the coordinates (0.60, 0.21) of the dot r ([α]:$q\geq(-5/46)\times i$ and [β]:$q<(73/88)\times i$). The M hue indicates colors the IQ values of which are plotted in an area formed between the straight lines [β] and [γ] and including the coordinates (0.28, 0.52) of the dot m ([β]:$q\geq(73/88)\times i$ and [γ]:$q>(-83/4)\times i$). The B hue indicates colors the IQ values of which are plotted in an area formed between the straight lines [γ] and [α] and including the coordinates (−0.32, 0.31) of the dot b ([γ]:$q\leq(-83/4)\times i$ and [α]:$q>(-5/46)\times i$). The C hue indicates colors the IQ values of which are plotted in an area formed between the straight lines [α] and [β] and including the coordinates (−0.30, −0.21) of the dot c ([α]:$q\leq(-5/46)\times i$ and [β]:$q>(73/88)\times i$). The G hue indicates colors the IQ values of which are plotted in an area formed between the straight lines [β] and [γ] and including the coordinates (−0.28, −0.52) of the dot g ([β]:$q\leq(73/88)\times i$ and [γ]:$q<(-83/4)\times i$). The Y hue indicates colors the IQ values of which are plotted in an area formed between the straight lines [γ] and [α] and including the coordinates (0.32, −0.31) of the dot y ([γ]:$q\geq(-83/4)\times i$ and [α]:$q<(-5/46)\times i$).

Referring back to FIG. 7, the character color mix determination unit 103 determines whether the hue of the object determined in step 6 is a specific color (by default, any one of the R, M, and B hues) (S7). If the determined hue is not a specific color (NO in S7), the character color mix determination unit 103 returns to step 9. If the determined hue is a specific color (YES in S7), the character color mix determination unit 103 sets col_flag at 1 (S8) and then returns to step 9.

The character color mix determination unit 103 repeats steps 3 through 10 for all characters in the original color image to determine whether their colors are black or specific colors. If any one of the characters is determined to be a black character, bk_flag is set at 1. Also, if any one of the characters is determined to be a specific color character, col_flag is set at 1.

When colors of all characters are determined (NO in S9), the character color mix determination unit 103 multiplies bl_flag and col_flag to calculate a color mix determination parameter "judge" (S11). The color mix determination parameter "judge" becomes 1 if both bl_flag and col_flag are 1, in other words, if both black and specific color characters are in the original color image. Accordingly, judge=1 indicates that both black and specific color characters are in the original color image and judge=0 indicates only black characters or specific color characters are in the original color image.

When two or more colors are selected as specific colors, the character color mix determination unit 103 determines, separately, whether the IQ values (q, i) of a character belongs to the respective specific colors. For example, when the R hue and the G hue are selected as specific colors, the character color mix determination unit 103 determines whether the color of a character belongs to the R hue by determining whether the IQ values fulfill conditions "[α]:$q\geq(-5/46)\times i$ and [β]:$q<(73/88)\times i$", and determines whether the color of the character belongs to the G hue by determining whether the IQ values fulfill conditions "[β]:$q\leq(73/88)\times i$ and [γ]:$q<(-83/4)\times i$". As an exception, if areas of two or more specific colors are adjacent to each other, the character color mix determination unit 103 determines, collectively, whether the IQ values (q, i) of a character belongs to the specific colors. For example, when default specific colors, the R hue, the M hue, and the B hue, are selected, it is possible to determine whether the color of a character belongs to any one of the R, M, and B hues by determining whether the IQ values are in an area above the straight line [α] shown in FIG. 8. Therefore, when default specific colors, the R hue, the M hue, and the B hue, are selected, the character color mix determination unit 103 determines whether the color of a character belongs to any one of the R, M, and B hues by determining whether the IQ values fulfill a condition "$q\geq(-5/46)\times i$".

The color conversion unit 104 and the black generation/under color removal unit 105 operate in different manners according to the object type, the object color, and the monochrome conversion ON/OFF information.

1. Processes Performed when the Monochrome Conversion Mode is Turned Off (1) For Color Objects In this case, RGB color signal values corresponding to three primary colors of light are converted into CMYK (C=cyan, M=magenta, Y=yellow, K=black) color signal values corresponding to primary colors of coloring materials. In this process, the color conversion unit 104 converts RGB values into C'M'Y' values based on a prestored three-dimensional look-up table and then the black generation/under color removal unit 105 converts the C'M'Y' values into CMYK values.

(2) For Monochrome Objects

The color conversion unit 104 converts each of the C'M'Y' values into a value obtained by inverting the Y value of YIQ values (C'=M'=Y'=255−Y). Then, the black generation/under color removal unit 105 replaces 100% of C'M'Y' with K.

2. Processes Performed when the Monochrome Conversion Mode is Turned On (1) For Objects Other than Characters The color conversion unit 104 converts each of the C'M'Y' values into a value obtained by inverting the Y value of YIQ values (C'=M'=Y'=255−Y). Then, the black generation/under color removal unit 105 replaces 100% of C'M'Y' with K.

(2) For Characters

The color conversion unit 104 converts the Y value of YIQ values into a Y' value (luminance conversion process or image density conversion process) and converts each of the C'M'Y' values into a value obtained by inverting the Y' value (C'=M'=Y'=255−Y'). Then, the black generation/under color removal unit 105 replaces 100% of C'M'Y' with K.

Figure 9:
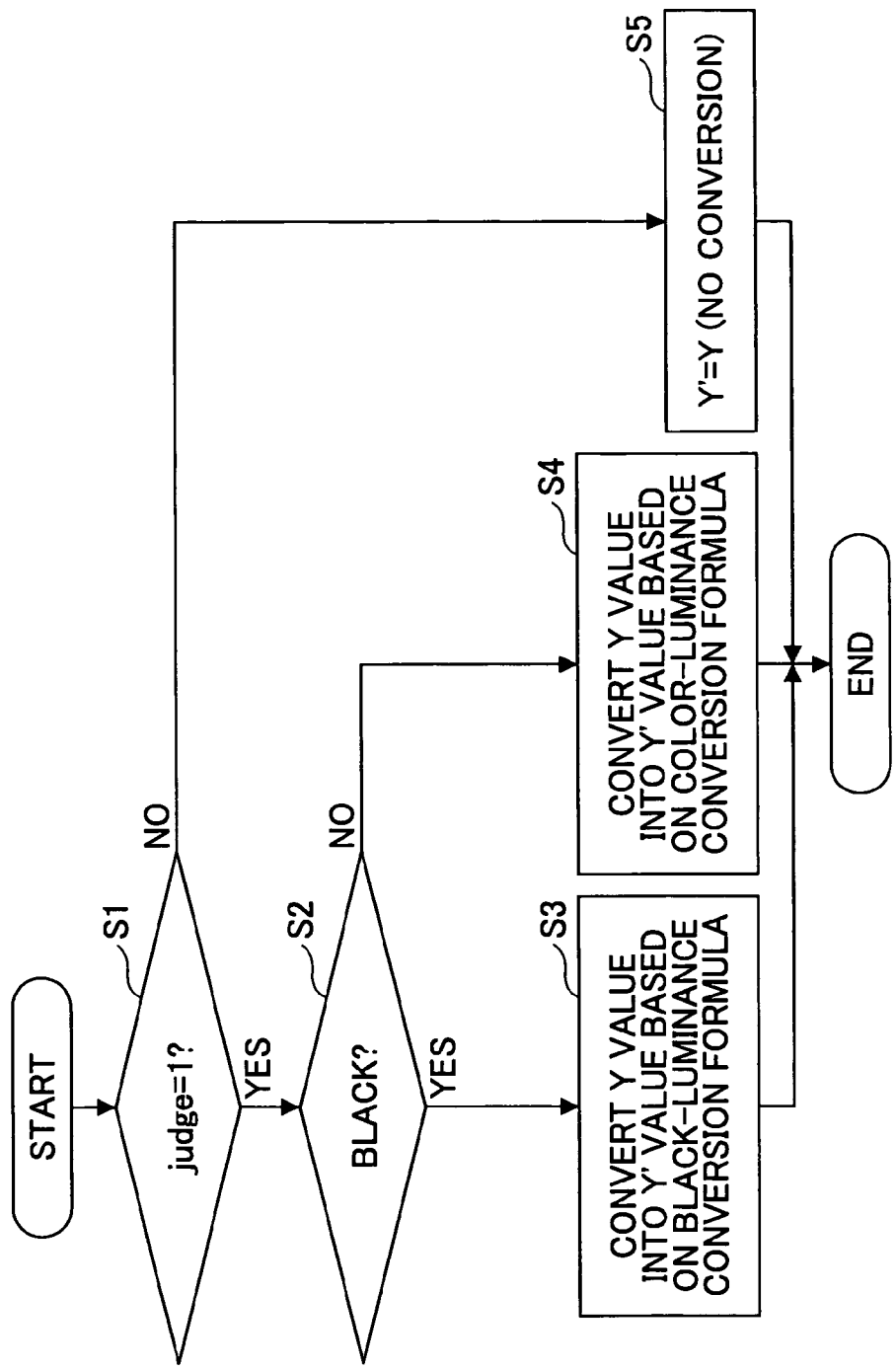
FIG. 9 is a flowchart showing a luminance conversion process performed by a color conversion unit of the copier.

FIG. 9 is a flowchart showing a luminance conversion process performed by the color conversion unit 104. In FIG. 9, the color conversion unit 104 determines whether the color mix determination parameter "judge" is 1 (S1). In other words, the color conversion unit 104 determines whether black characters and specific color characters are mixed in an original color image. If the color mix determination parameter "judge" is not 1 (NO in S1), the Y' value of each character is set at the same value as the Y value. In other words, if black characters and specific color characters are not mixed, luminance conversion (or image density conversion) of characters is not performed. Meanwhile, if the color mix determination parameter "judge" is 1 (YES in S1) or if black characters and specific color characters are mixed, luminance of characters are converted. Specifically, if black characters and specific color characters are mixed, the color conversion unit 104 determines whether the color of each character is black (S2). If the color of the character is black (YES in S2), the Y value of the character is converted into a Y' value based on a black-luminance conversion formula prestored in a data storage unit (S3). If the color of the character is not black (NO in S2), the Y value of the character is converted into a Y' value based on a color-luminance conversion formula prestored in the data storage unit (S4).

Figure 10:
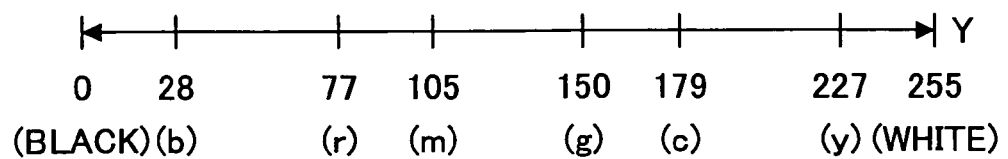
FIG. 10 is a graph where luminance values of the palest red (r), magenta (m), blue (b), cyan (c), green (g), yellow (y), and black (k) are plotted in a one-dimensional coordinate system.
Figure 11:
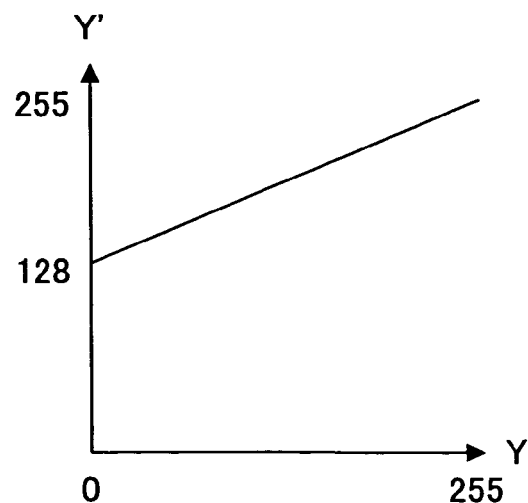
FIG. 11 is a graph showing characteristics of a black-luminance conversion formula used by the color conversion unit.
Figure 12:
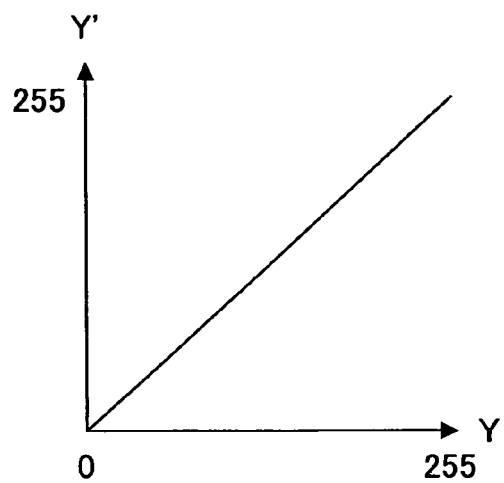
FIG. 12 is a graph showing characteristics of a color-luminance conversion formula used by the color conversion unit.

The black-luminance conversion formula and the color-luminance conversion formula may employ various luminance conversion methods. For example, formulas that change only the luminance of black (including gray) may be used. In this case, the luminance of black is made greater than the luminance of specific colors. FIG. 10 is a graph where luminance values of the palest red (r), magenta (m), blue (b), cyan (c), green (g), yellow (y), and black (k) are plotted in a one-dimensional coordinate system. In FIG. 10, it is assumed that default specific colors, the R, M, and B hues, are selected and that the luminance value of black is 0 and the luminance values of b, r, and m are 28, 77, and 105, respectively. With the above assumption, the tone of black can be made paler than the tones of b, r, and m by just changing the luminance value of black to a value greater than 105. In this case, the color conversion unit 104 uses a linear formula as shown in FIG. 11 as the black-luminance conversion formula, the Y' intercept (a Y' value when Y=0) of which in a Y'-Y coordinate system is 128. As the color-luminance conversion formula, the color conversion unit 104 uses a linear formula as shown in FIG. 12, the Y' intercept of which in the Y'-Y coordinate system is 0 (i.e., the luminance of colors other than black are practically not changed). With the above formulas, color characters are represented in grayscale levels corresponding to their colors and black characters are represented in a grayscale level paler than the grayscale levels of the color characters.

The above example is based on an assumption that the R, M, and B hues are selected as specific colors. When only one hue is selected as a specific color, a linear formula with the Y' intercept greater than the luminance level of the selected hue is used as the black-luminance conversion formula. When two or more hues are selected as specific colors, a linear formula with the Y' intercept greater than the largest one of the luminance levels of the selected hues is used as the black-luminance conversion formula. Therefore, the color conversion unit 104 uses any one of the following six formulas stored in the data storage unit as the black-luminance conversion formula:

A formula having the Y' intercept between the luminance value of b (28) and the luminance value of r (77).
A formula having the Y' intercept between the luminance value of r (77) and the luminance value of m (105).
A formula having the Y' intercept between the luminance value of m (105) and the luminance value of g (150) (FIG. 11).
A formula having the Y' intercept between the luminance value of g (150) and the luminance value of c (179).
A formula having the Y' intercept between the luminance value of c (179) and the luminance value of y (227).
A formula having the Y' intercept between the luminance value of y (227) and the luminance value of white (255).

Instead of the black-luminance conversion formula and the color-luminance conversion formula as described above, a black-luminance conversion table and a color-luminance conversion table showing the correspondence between the Y values and the Y' values may be used.

Figure 13:
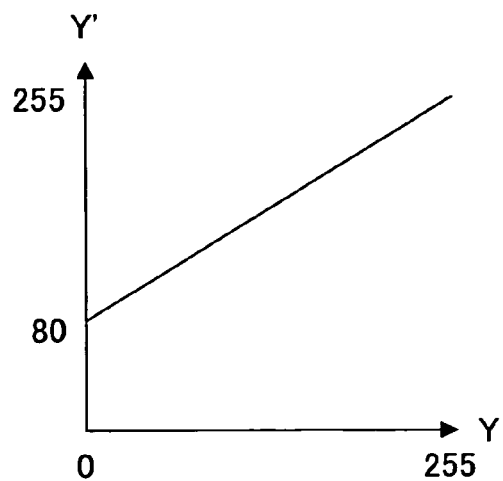
FIG. 13 is a graph showing characteristics of a first variation of the black-luminance conversion formula.
Figure 14:
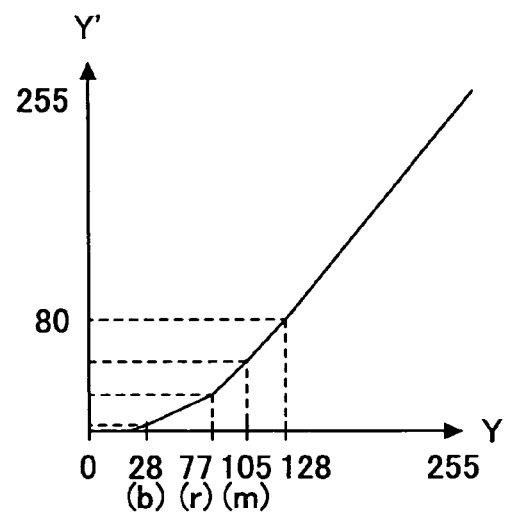
FIG. 14 is a graph showing characteristics of a first variation of the color-luminance conversion formula.

Also, formulas that convert the luminance of both black and other colors may be used as the black-luminance conversion formula and the color-luminance conversion formula. In this case, the color conversion unit 104 uses a linear formula as shown in FIG. 13 as the black-luminance conversion formula, the Y' intercept of which in the Y'-Y coordinate system is a specific value (in this example, 80). As the color-luminance conversion formula, the color conversion unit 104 uses a formula as shown in FIG. 14 having no Y' intercept, with which the Y' values corresponding to the Y values of the specific colors become smaller than the specific value (in this example, 80). Here, it is assumed that the R, M, and B hues are selected as the specific colors. In FIG. 14, the Y' values corresponding to the Y values of b, r, and m are smaller than 80. With the above formulas, the R, M, and B hues become paler than black after monochrome conversion. Compared with the method of changing only the luminance of black, this luminance conversion method makes it possible to increase the image density after monochrome conversion of black characters that occupy a large portion of an original color image and thereby makes it possible to improve the readability of the entire document.

Further, formulas that convert the luminance of colors such that red and magenta characters are represented in a tone(s) darker than that of other characters after monochrome conversion may be used as the black-luminance conversion formula and the color-luminance conversion formula. Such formulas have advantages as described below. Red and magenta are typically used to attract the attention of readers. Therefore, converting red and magenta characters in a color image into a darker tone(s) may make it possible to correctly reflect the creator's intention of emphasizing the characters. Meanwhile, the Y values of red (77) and magenta (105) are greater than the Y value of blue (28) as shown in FIG. 14. For this reason, if characters in the R, M, and B hues selected as specific colors are converted into monochrome characters without changing their luminance relationships, monochrome characters corresponding to the original blue characters become more noticeable than those corresponding to the original red and magenta characters. Therefore, when red and magenta are selected as specific colors, it is preferable to convert characters such that monochrome characters converted from red and magenta characters are expressed in a tone darker than that of other monochrome characters. This makes it possible to correctly reflect the creator's intention of emphasizing the characters.

Figure 15:
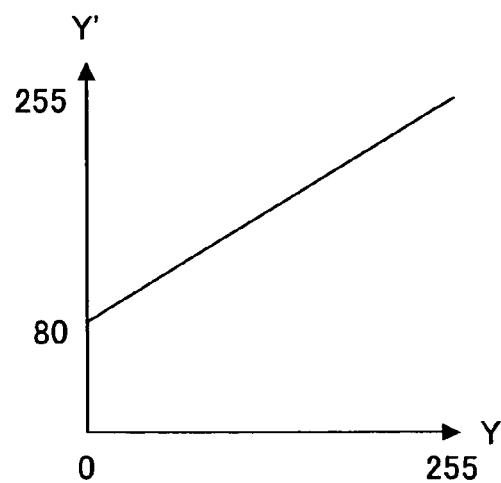
FIG. 15 is a graph showing characteristics of a second variation of the black-luminance conversion formula.
Figure 16:
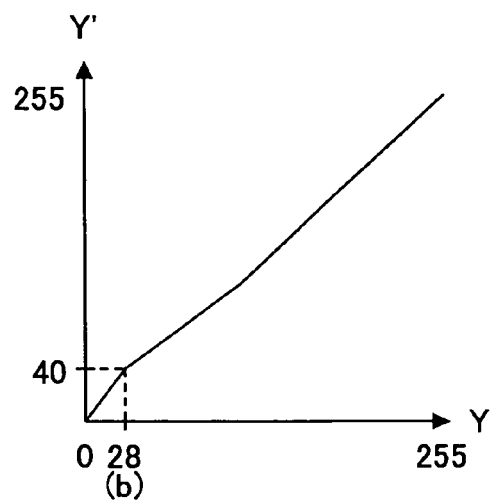
FIG. 16 is a graph showing characteristics of a blue-luminance conversion formula that constitutes a part of a second variation of the color-luminance conversion formula.
Figure 17:
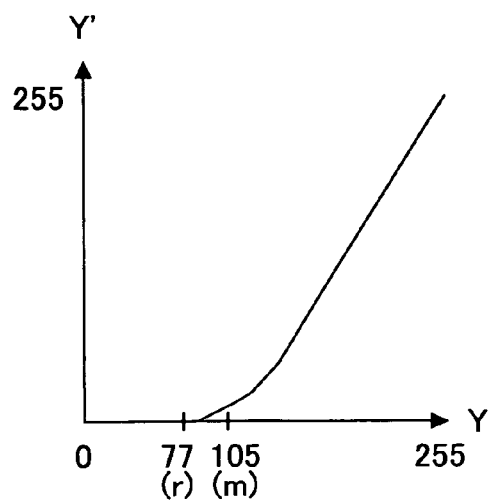
FIG. 17 is a graph showing characteristics of a red/magenta-luminance conversion formula that constitutes a part of the second variation of the color-luminance conversion formula.

To convert the luminance of colors such that red and magenta characters are expressed in a darker tone(s) after monochrome conversion, luminance conversion formulas as shown in FIGS. 15 through 17 may be used. FIG. 15 is a graph showing characteristics of a black-luminance conversion formula. Similar to the formula shown in FIG. 13, the Y' intercept of the formula shown in FIG. 15 has a specific value (in this example, 80) in the Y'-Y coordinate system for black. FIG. 16 is a graph showing characteristics of a blue-luminance conversion formula. FIG. 17 is a graph showing characteristics of a red/magenta-luminance conversion formula. As shown in FIG. 16, the Y value of blue (28) is converted into a Y' value that is one half of the specific value (the Y' value of black). As a result, blue characters are converted into monochrome characters that are darker than those corresponding to the original black characters. As shown in FIG. 17, the Y value of red (77) is converted into a Y' value "0". As a result, red characters are converted into monochrome characters with the highest image density (darkest monochrome characters). Also as shown in FIG. 17, the Y value (105) of magenta is converted into a Y' value that is close to 0. As a result, magenta characters are converted into monochrome characters with the second highest image density after the monochrome characters corresponding to the original red characters.

The above luminance conversion formulas are preferably determined so that the differences ΔE in Lab between the Y' value of black and the Y' values of other colors become greater than 5 (ΔE>5) and that monochrome characters corresponding to original black characters and those corresponding to original color characters can be clearly distinguished.

Referring back to FIG. 4, the γ correction unit 106 converts CMYK color values in draw commands corresponding to various objects output from the black generation/under color removal unit 105 into values from 0 to 255 according to a look-up table or an algorithm prestored in the data storage unit. In other words, the γ correction unit 106 performs gamma correction on the objects to convert the CMYK color values into values suitable for the printing unit 1 of the copier of this embodiment.

The bitmapping unit 107 loads an image in a bitmap format into a drawing memory area of a data storage unit (not shown) of the image processing device 100 according to the gamma-corrected draw commands output from the γ correction unit 106.

The pseudo-halftone processing unit 108 performs pseudo-halftone processing to reduce the number of bits of the loaded bitmap image and to express halftones of the image with the number of dots per unit area. For example, when 8 bits are necessary to express the gradations of each of the CMYK colors, the pseudo-halftone processing unit 108 performs dithering to express the gradations of each of the CMYK colors with 2 bits. The dithered bitmap image is stored, page by page, in a bitmap memory of the pseudo-halftone processing unit 108.

The digital data of the bitmap image stored in the bitmap memory are sent to the print control unit 140. The print control unit 140 controls the printing unit 1 according to the digital data of the bitmap image to form the bitmap image on a recording medium. In the above embodiment, a color printer having a monochrome conversion mode is used. However, a similar color-to-monochrome conversion method may also be applied to a monochrome image forming apparatus.

In the copier of this embodiment, luminance of colors is converted when a color image is converted into a monochrome image such that the image density of monochrome characters corresponding to original specific color characters becomes greater than the image density of monochrome characters corresponding to original black characters. This configuration makes it possible to emphasize specific color characters even after monochrome conversion without changing character properties excluding color and thereby makes it possible to prevent giving wrong information to the readers. Also, unlike the image processing device disclosed in patent document 1, the image processing device 100 of this embodiment does not change character properties excluding color (e.g., underline and boldface) of specific color characters. This in turn makes it possible to reduce the consumption of color materials (toner). Further, the image processing device 100 of this embodiment makes it possible to reduce the image density of black characters that generally occupy the largest portion of an original color image when converting the original color image into a monochrome image and thereby makes it possible to reduce the consumption of color materials.

In the copier of this embodiment, as shown in FIG. 9, if no specific-color character is included in a color image (NO in S1), luminance conversion is not performed and the color image is converted into a monochrome image without changing the image density of black characters in the color image. This configuration makes it possible to improve the readability of black characters when no specific-color character is included in a color image.

Next, copiers according to second and third embodiments of the present invention are described. The basic configurations of the copiers of the second and third embodiments are substantially the same as those of the first embodiment.

Second Embodiment

The image processing device 100 of the copier of the second embodiment determines, using the command analysis unit 101, whether received color image information includes multiple pages. If the color image information includes multiple pages, the image processing device 100 performs, page by page, a mix determination process (as shown in FIG. 7) of determining whether the page includes character images in specific colors (by default, the R, M, and B hues) and a density setting process (as shown in FIG. 9) of setting the image density (or the luminance) of black character images according to the result of the mix determination process. In other words, if the color image information includes multiple pages, the character color mix determination unit 103 determines, page by page, whether specific color character images are included in the color image and the color conversion unit sets the image density of the black character images, page by page, based on the determination result of the character color mix determination unit. This configuration makes it possible to maintain the original image density of black characters in a page where black and specific color character images are not mixed even if black and specific color character images are mixed in the color image as a whole. This in turn makes it possible to improve the readability of characters in the page. Take, for example, a case where most of the pages of a color image include only black characters and only a small number of pages include specific color characters. In this case, the image density of black characters in the small number of pages only has to be reduced and the image density of black characters in most of the pages can be left unchanged. This approach makes it possible to improve the readability of characters in most of the pages.

Third Embodiment

The image processing device 100 of the copier of the third embodiment determines a combination of black character images and specific color character images in an original color image which have the same character properties excluding color, and performs a process of reducing the image density of the black character images to a level lower than that of the specific color character images only for the determined combination. More specifically, the character color mix determination unit 103 determines a combination of black character images and specific color character images in a color image which have the same character properties excluding color; and the color conversion unit 104 performs a process of reducing the image density of the black character images to a level lower than the image density of the specific color character images only for the determined combination. In other words, even if black character images and specific color character images are mixed, the process of reducing the image density is not performed if their character properties excluding color are different. In this case, the image processing device 100 converts both the black character images and the specific color character images into monochrome images with image density corresponding to their original colors.

In the copier of this embodiment, the following five character properties excluding color of black character images and specific color character images are compared: font (a kind of typeface), character size, ON/OFF of italic (a kind of typeface), ON/OFF of underline (a kind of character decoration), and ON/OFF of boldface (character thickness).

FIG. 18 is a drawing illustrating exemplary data tables stored in a data storage unit of the character color mix determination unit 103 of the copier of the third embodiment. As shown in FIG. 18, the data storage unit of the character color mix determination unit 103 stores a bk data table and a col data table including parameters used to determine whether black character images and specific color character images have the same character properties excluding color. The data storage unit of the character color mix determination unit 103 also stores a judge data table including parameters used to determine whether black character images and specific color character images having the same character properties are mixed. Each row of the data tables shows a combination of character properties including font, size, italic, underline, and boldface that are different from color. Hereafter, a combination of values of the five character properties is called "five character property values".

Figure 19:
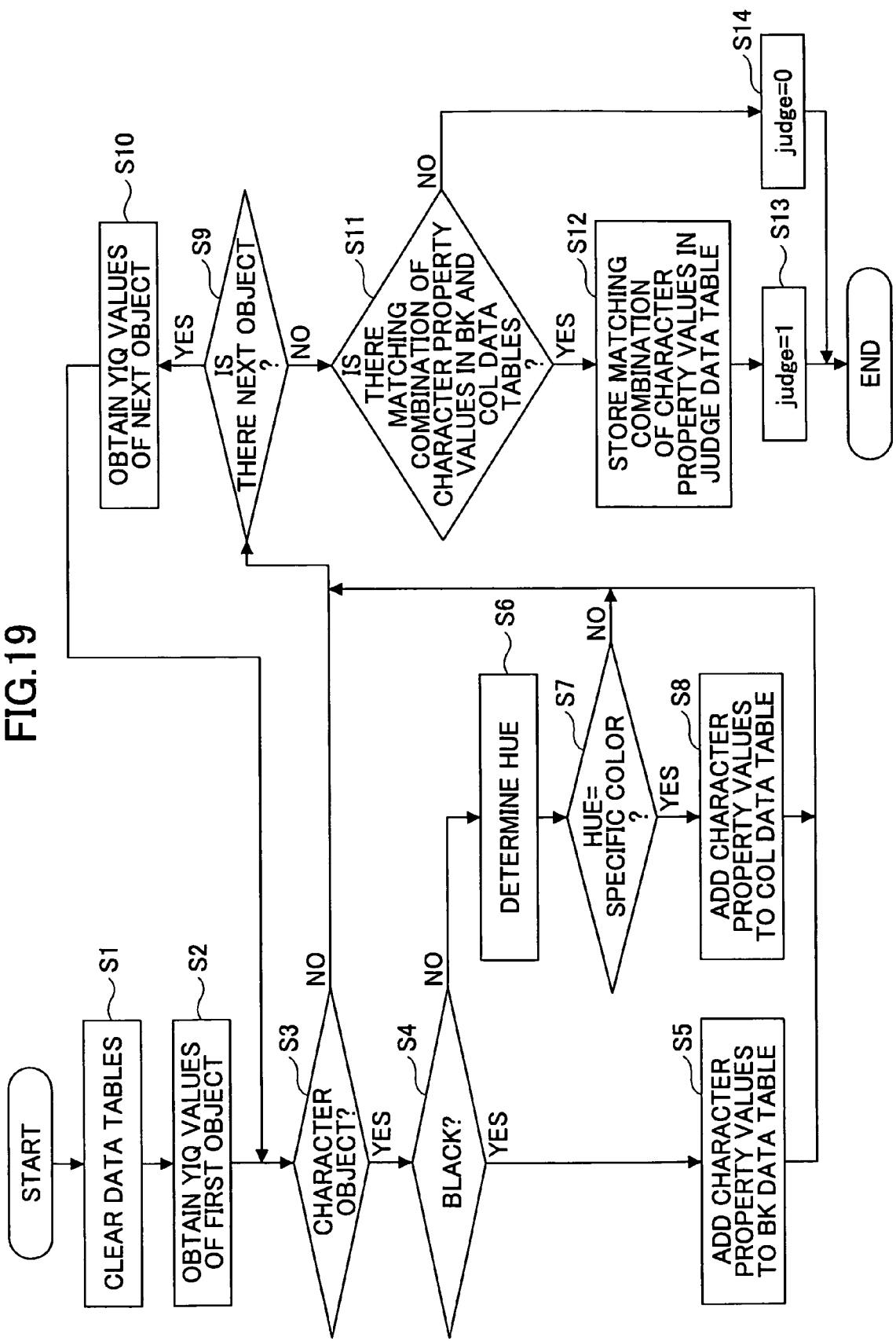
FIG. 19 is a flowchart showing a mix determination process performed by the character color mix determination unit of the copier of the third embodiment.

FIG. 19 is a flowchart showing a mix determination process performed by the character color mix determination unit 103 of the copier of the third embodiment. In the flowchart, the character color mix determination unit 103 first clears the bk data table, the col data table, and the judge data table (S1). Next, the character color mix determination unit 103 obtains YIQ values of a first object in an original color image (S2) and determines whether the object is a character (S3). If the object is not a character (NO in S3), the character color mix determination unit 103 determines whether there is a next object (S9). If there is a next object (YES in S9), the character color mix determination unit 103 obtains YIQ values of the next object (S10) and returns to step 3 to determine whether the next object is a character.

If the object is a character (YES in S3), the character color mix determination unit 103 determines whether the color of the character is black (S4). If the color is black (YES in S4), the character color mix determination unit 103 stores the five character property values of the character in the bk data table (S5). As an exception, if the same five character property values are already stored in the bk data table, the character color mix determination unit 103 does not add the five character property values to the bk data table. In other words, the character color mix determination unit 103 stores the five character property values of a character in the bk data table only when they are a new combination that has not been stored in the bk data table.

In step 4, if the color of the character is not black (NO in S4), the character color mix determination unit 103 determines the hue of the character (S6). The character color mix determination unit 103 determines whether the hue of the character determined in step 6 is a specific color (by default, any one of the R, M, and B hues) (S7). If the color is a specific color (YES in S7), the character color mix determination unit 103 stores the five character property values of the character in the col data table (S8). Similar to step 5, the character color mix determination unit 103 stores the five character property values of the character in the col data table only when they are a new combination that has not been stored in the col data table. Then, the character color mix determination unit 103 returns to step 9 and determines whether there is a next object. In step 7, if the color is not a specific color (NO in S7), the character color mix determination unit 103 does not store the five character property values of the character in the col data table and returns to step 9 to determine whether there is a next object.

The character color mix determination unit 103 repeats steps 3 through 10, thereby obtains five character property values of black characters in the original color image, and stores new combinations of the five character property values in the bk data table. Similarly, the character color mix determination unit 103 obtains five character property values of specific color characters in the original color image and stores new combinations of the five character property values in the col data table.

After performing steps 3 through 10 for all characters (NO in S9), the character color mix determination unit 103 compares the combinations of the five character property values in the bk data table with the combinations of the five character property values in the col data table (S11). If the same combination of five character property values is found in both of the data tables (YES in S11), the character color mix determination unit 103 stores the found combination of five character property values in the judge data table (S12) and sets the color mix determination parameter "judge" at 1 (S13). If the same combination of five character property values is not found in the tables (NO in S11), the character color mix determination unit 103 sets the color mix determination parameter "judge" at 0 (S14).

Thus, if there is a combination of black characters and specific color characters having the same five character property values in the original color image, the character color mix determination unit 103 stores the five character property values in the judge data table and sets the color mix determination parameter "judge" at 1. On the other hand, if there is no combination of black characters and specific color characters having the same five character property values in the original color image, the character color mix determination unit 103 leaves the judge data table blank and sets the color mix determination parameter "judge" at 0.

Figure 20:
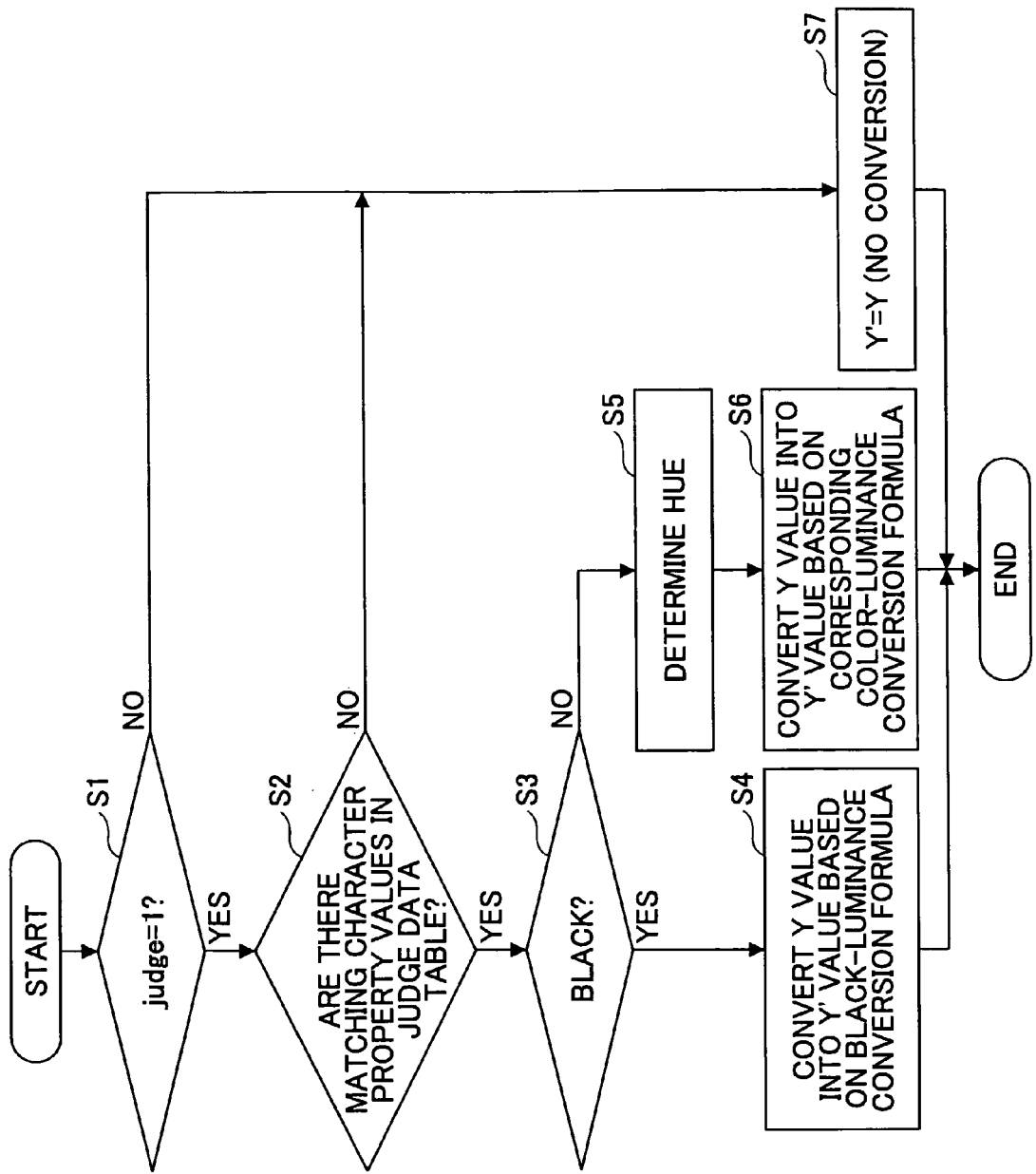
FIG. 20 is a flowchart showing a luminance conversion process performed by a color conversion unit of the copier of the third embodiment.

FIG. 20 is a flowchart showing a luminance conversion process performed by the color conversion unit 104 of the copier of the third embodiment. In FIG. 20, the color conversion unit 104 determines whether the color mix determination parameter "judge" is 1 (S1). In other words, the color conversion unit 104 determines whether there is a combination of black characters and specific color characters having the same five character property values in an original color image. If the color mix determination parameter "judge" is not 1, in other words, if there is no combination of black characters and specific color characters having the same five character property values in the original color image (NO in S1), the color conversion unit 104 sets the Y' value of each character at the same value as the Y value. That is, if there is no combination of black characters and specific color characters having the same five character property values in the original color image, luminance conversion (or image density conversion) of characters is not performed. Meanwhile, if the color mix determination parameter "judge" is 1 (YES in S1) or if there is a combination of black characters and specific color characters having the same five character property values in the original color image, luminance of those characters are converted. More specifically, if there is a combination of black characters and specific color characters having the same five character property values, the color conversion unit 104 determines, for each character in the original color image, whether its five character property values match the five character property values stored in the judge data table (S2). If the five character property values match (YES in S2) and the character is black (YES in S3), the color conversion unit 104 converts the Y value of the character into a Y' value based on a black-luminance conversion formula prestored in a data storage unit. Meanwhile, if the five character property values match (YES in S2) and the character is not black (NO in S3), the color conversion unit 104 determines the hue of the character (S5) and converts the Y value of the character into a Y' value based on a luminance conversion formula corresponding to the determined hue (S6).

Thus, the color conversion unit 104 performs a process of reducing the image density of black characters to a level lower than that of specific color characters only for a combination of black characters and specific color characters in an original color image which have the same five character property values.

FIG. 21 is a drawing illustrating a first exemplary original color image. FIG. 22 is a drawing illustrating a monochrome image obtained by converting the first exemplary original color image by the copier of the third embodiment. In FIG. 21, a part of a character string is enclosed by a dotted line. The dotted line is provided for descriptive purposes and is not included in the color image. As shown in FIG. 21, the first exemplary color image includes a character string "Review meeting for XXX will be held on July 20 (Monday). Your participation is requested." The five character property values of all characters constituting the character string are the same. However, the characters "July 20 (Monday)" enclosed in the dotted line are drawn in red and other characters are drawn in black. When the color image is converted into a monochrome image by the image processing device 100 of the copier of this embodiment, monochrome characters corresponding to the original red characters "July 20 (Monday)" become darker than monochrome characters corresponding to the original black characters.

Figure 23:
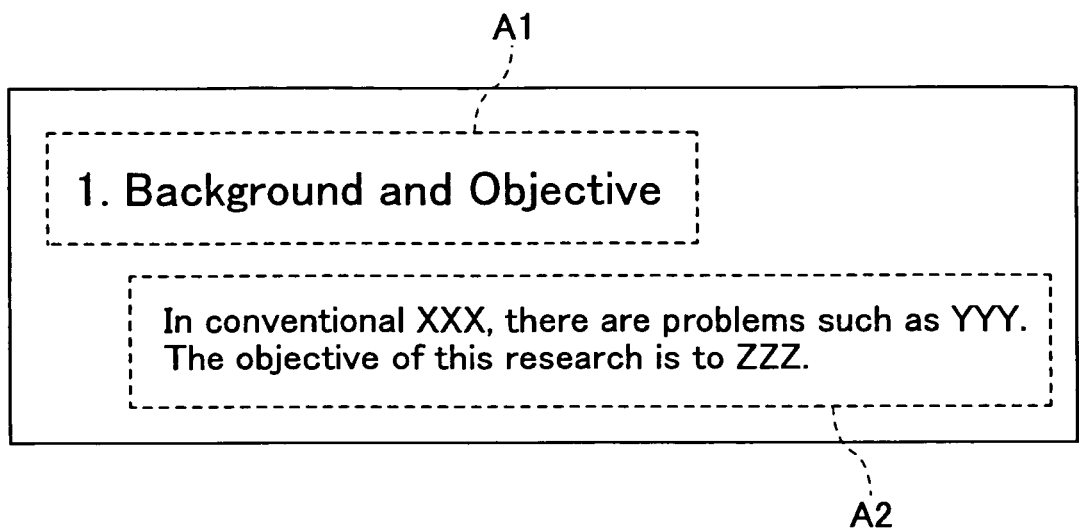
FIG. 23 is a drawing illustrating a second exemplary original color image.
Figure 24:
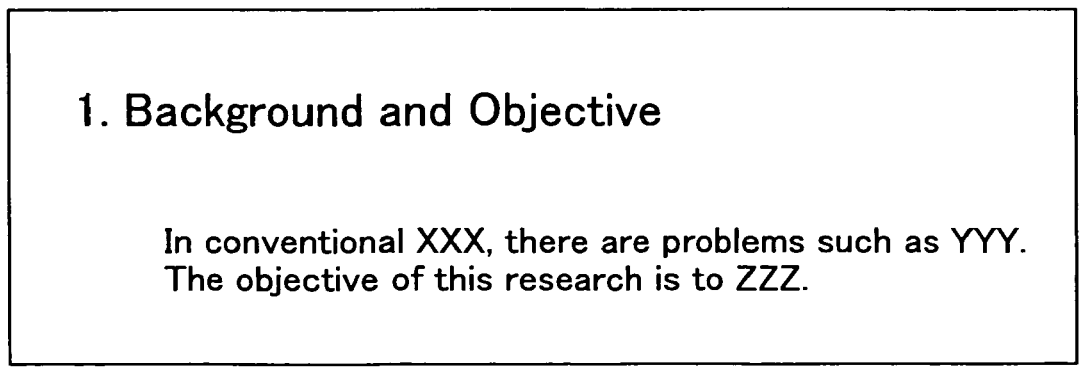
FIG. 24 is a drawing illustrating a monochrome image obtained by converting the second exemplary original color image by the copier of the third embodiment.

FIG. 23 is a drawing illustrating a second exemplary original color image. FIG. 24 is a drawing illustrating a monochrome image obtained by converting the second exemplary original color image by the copier of the third embodiment. In the second example, it is assumed that blue is selected as a specific color. In FIG. 23, dotted lines A1 and A2 are provided for descriptive purposes and are not included in the color image. The second exemplary original color image includes a first character string "1. Background and Objective" enclosed by the dotted line A1 and a second character string "In conventional XXX, there are problems such as YYY. The objective of this research is to ZZZ." enclosed by the dotted line A2. Characters constituting the first character string are drawn in blue and their character size (one of the five character property values) is set at 14 pt. Characters constituting the second character string are drawn in black and their character size is set at 10 pt. Thus, the five character property values of the specific color characters constituting the first character string are different from those of the black characters constituting the second character string. Therefore, as shown in FIG. 24, the image density of the black characters constituting the second character string is not reduced during monochrome conversion to a level lower than that of the specific color characters constituting the first character string, and the black characters are drawn in dark black even after the monochrome conversion.

Figure 25:
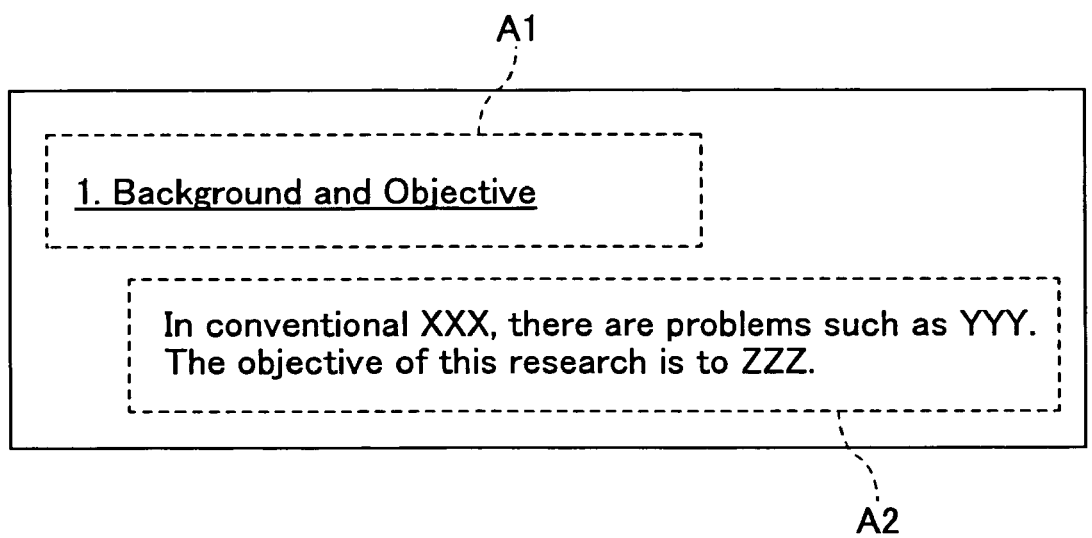
FIG. 25 is a drawing illustrating a third exemplary original color image.
Figure 26:
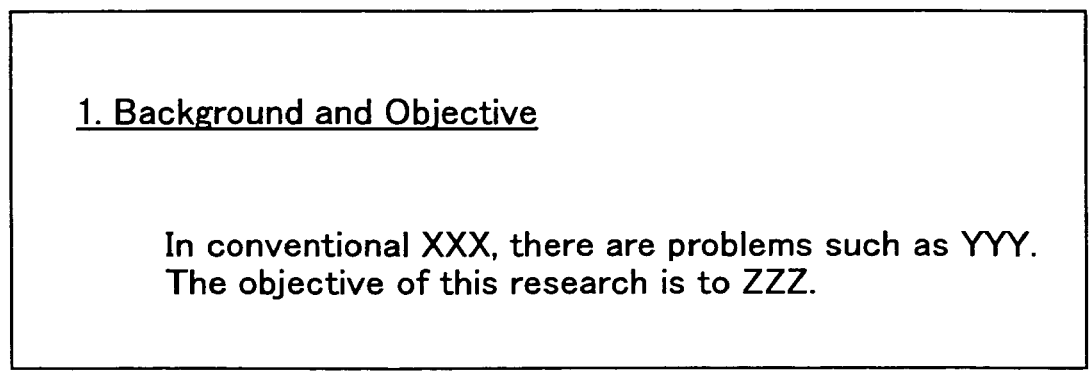
FIG. 26 is a drawing illustrating a monochrome image obtained by converting the third exemplary original color image by the copier of the third embodiment.

FIG. 25 is a drawing illustrating a third exemplary original color image. FIG. 24 is a drawing illustrating a monochrome image obtained by converting the third exemplary original color image by the copier of the third embodiment. Also in the third example, it is assumed that blue is selected as a specific color. As shown in FIG. 25, the third exemplary original color image includes a first character string enclosed by a dotted line A1 and a second character string enclosed by a dotted line A2. Characters constituting the first character string are drawn in blue and their character properties are set as follows: character size=10 pt and underline=ON. Characters constituting the second character string are drawn in black and their character properties are set as follows: character size=10 pt and underline=OFF. Thus, the five character property values of the specific color characters constituting the first character string are different from those of the black characters constituting the second character string. Therefore, as shown in FIG. 26, the image density of the black characters constituting the second character string is not reduced during monochrome conversion to a level lower than that of the specific color characters constituting the first character string, and the black characters are drawn in dark black even after the monochrome conversion. Meanwhile, the five character property values are not changed during the monochrome conversion and therefore monochrome characters corresponding to the specific color characters constituting the first character string are underlined even after the monochrome conversion.

Figure 27:
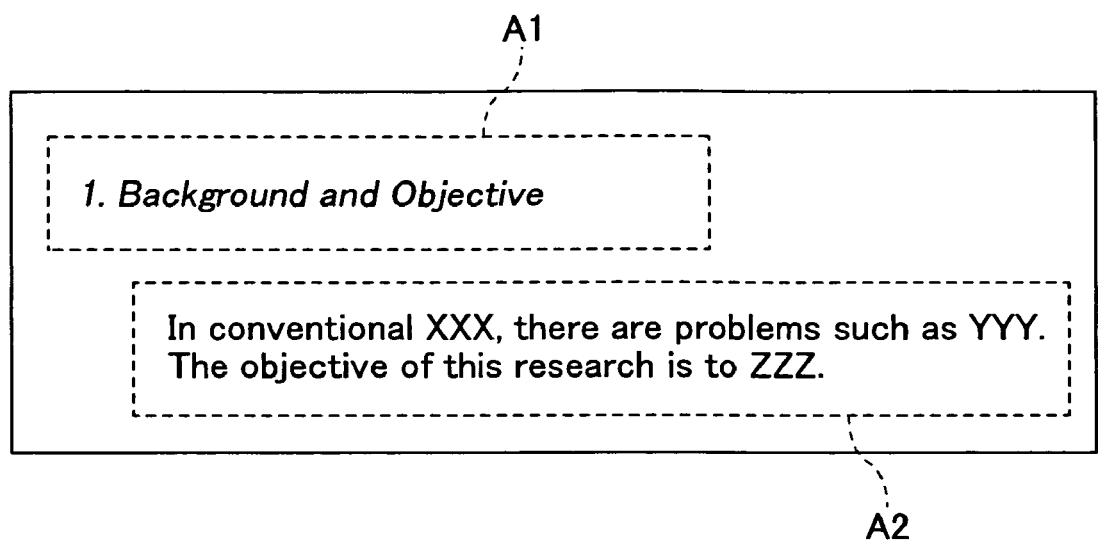
FIG. 27 is a drawing illustrating a fourth exemplary original color image.
Figure 28:
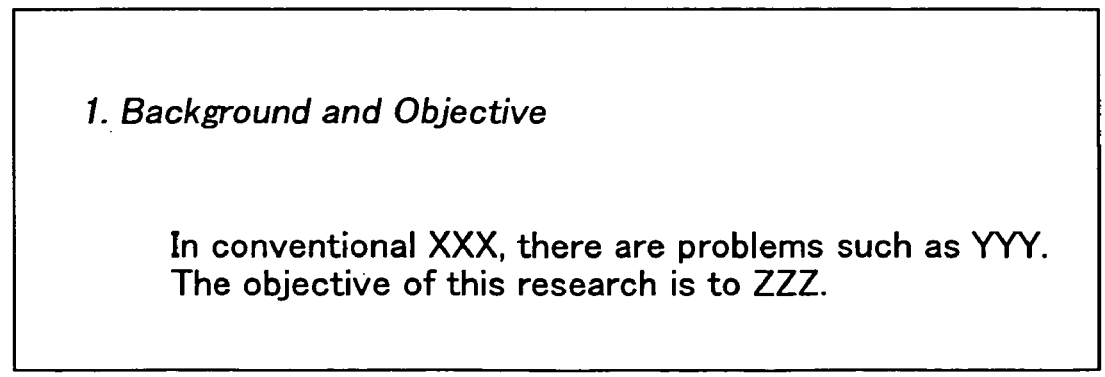
FIG. 28 is a drawing illustrating a monochrome image obtained by converting the fourth exemplary original color image by the copier of the third embodiment.

FIG. 27 is a drawing illustrating a fourth exemplary original color image. FIG. 28 is a drawing illustrating a monochrome image obtained by converting the fourth exemplary original color image by the copier of the third embodiment. Also in the fourth example, it is assumed that blue is selected as a specific color. As shown in FIG. 27, the fourth exemplary original color image includes a first character string enclosed by a dotted line A1 and a second character string enclosed by a dotted line A2. Characters constituting the first character string are drawn in blue and their character properties are set as follows: character size=10 pt and italic=ON. Characters constituting the second character string are drawn in black and their character properties are set as follows: character size=10 pt and italic=OFF. Thus, the five character property values of the specific color characters constituting the first character string are different from those of the black characters constituting the second character string. Therefore, as shown in FIG. 28, the image density of the black characters constituting the second character string is not reduced during monochrome conversion to a level lower than that of the specific color characters constituting the first character string, and the black characters are drawn in dark black even after the monochrome conversion. Meanwhile, the five character property values are not changed during the monochrome conversion and therefore monochrome characters corresponding to the specific color characters constituting the first character string are italicized even after the monochrome conversion.

Figure 29:
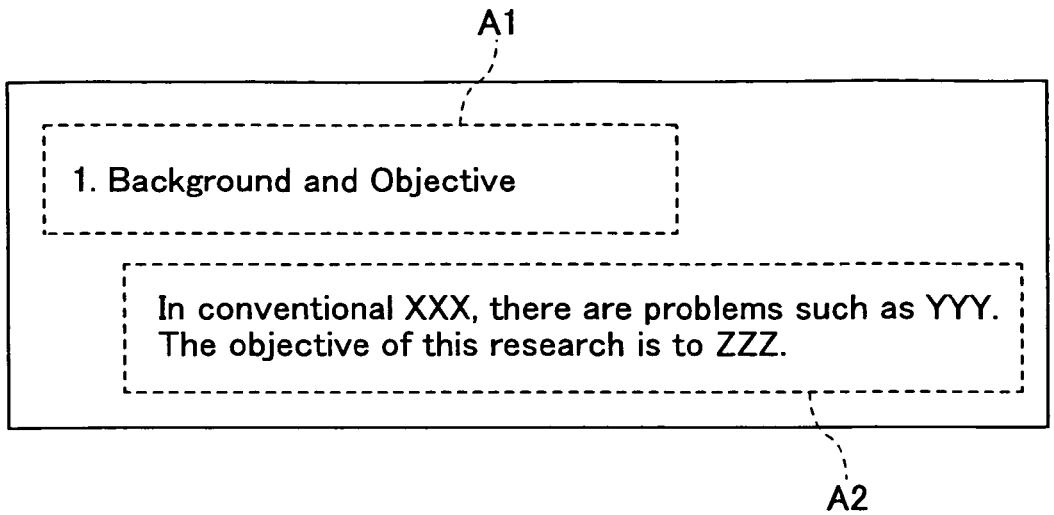
FIG. 29 is a drawing illustrating a fifth exemplary original color image.
Figure 30:
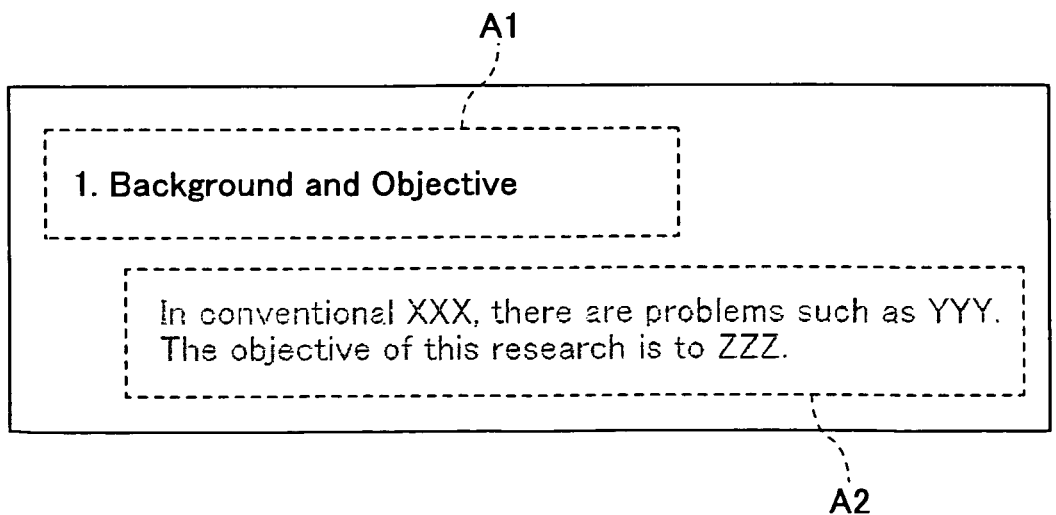
FIG. 30 is a drawing illustrating a monochrome image obtained by converting the fifth exemplary original color image by the copier of the third embodiment.

FIG. 29 is a drawing illustrating a fifth exemplary original color image. FIG. 30 is a drawing illustrating a monochrome image obtained by converting the fifth exemplary original color image by the copier of the third embodiment. Also in the fifth example, it is assumed that blue is selected as a specific color. As shown in FIG. 29, the fifth exemplary original color image includes a first character string enclosed by a dotted line A1 and a second character string enclosed by a dotted line A2. The first character string enclosed by the dotted line A1 is drawn in blue and the second character string enclosed by the dotted line A2 is drawn in black. The five character property values of the first character string and the second character string are the same. In other words, the five character property values of specific color characters constituting the first character string and black characters constituting the second character string are the same. Therefore, as shown in FIG. 30, the image density of the black characters constituting the second character string is reduced during monochrome conversion to a level lower than that of the specific color characters constituting the first character string, and the black characters become paler than the specific color characters after the monochrome conversion.

The above method, where black character image density is reduced to a level lower than specific color character image density only for a combination(s) of black characters and specific color characters having the same character properties excluding color (five character property values), provides advantageous effects as exemplified below. When specific color characters in an original color image are given character properties other than color, such as character size, underline, and italic, which are different from those of black characters, the copier of the third embodiment refrains from making the specific color characters darker than normal black characters because the specific color characters can be distinguished from other characters by the difference in the character properties. In other words, this method or configuration makes it possible to omit a process of differentiating specific color characters from black characters by image density if the black characters and the specific color characters are already differentiated by one or more of the five character property values. Also, drawing normal black characters in dark black even after monochrome conversion makes it possible to improve the readability of the black characters.

In patent document 1 described above, "emphasis" is mentioned as one of the character properties excluding color used during monochrome conversion. In patent document 1, the "emphasis" indicates character properties other than color and image density which can be used to emphasize characters. For example, the "emphasis" may indicate increasing the character size or increasing the character thickness.

The above embodiments are described using a copier that forms a multicolor image by superposing color materials of different colors. However, the present invention may also be applied to a monochrome image forming apparatus and an image processing device of the monochrome image forming apparatus.

The above embodiments are described using a copier that forms an image by an electrophotographic process using toner. However, the present invention may also be applied to an image forming apparatus that forms an image with toner but using an image forming process other than the electrophotographic process and to an image processing device of the image forming apparatus. For example, the present invention may be applied to an image forming apparatus that forms a toner image by direct printing. Direct printing indicates a method of directly forming a toner image (pixel image) on a recording medium or an intermediate recording medium without using a latent image carrier. In direct printing, particles of toner jetted from a toner jet device are caused to adhere onto a recording medium or an intermediate recording medium. For example, Japanese Patent Application Publication No. 2002-307737 discloses an image forming apparatus employing a direct printing method.

Also, the present invention may be applied to an image forming apparatus that forms an image using a color material other than toner and to an image processing device of the image forming apparatus. For example, the present invention may be applied to an inkjet image forming apparatus.

The above embodiments may also be implemented as a computer-readable storage medium such as a CD-ROM or a flash memory storing program code for causing a computer to function as the image processing device 100.

In the copier of the first embodiment, the image density of black character images is reduced to a level lower than that of specific color character images. In other words, after monochrome conversion, monochrome characters corresponding to original specific color characters (in one or more specific colors) in an original color image are expressed in a tone darker than that of monochrome characters corresponding to original black characters so that the monochrome characters corresponding to the original specific color characters become more noticeable than the monochrome characters corresponding to the original black characters.

In the copier of the first embodiment, red may be selected as one of the specific colors. With this configuration, after monochrome conversion, monochrome characters corresponding to red characters in an original color image are expressed in a tone darker than that of monochrome characters corresponding to black characters in the original color image so that the monochrome characters corresponding to the red characters become more noticeable than the monochrome characters corresponding to the black characters.

In the copier of the first embodiment, if no specific color character is included in a color image, the color image is converted into a monochrome image without changing the image density of black characters in the color image (without reducing the image density of the black characters to a level lower than that of the specific color characters). This configuration makes it possible to refrain from reducing the image density of black characters when no specific color character is included in a color image and thereby to improve the readability of the black characters.

In the copier of the second embodiment, if a color image is to be formed across multiple pages by the printing unit 1 used as a image forming unit (if the color image includes multiple pages), the image processing device 100 performs, page by page, a mix determination process of determining whether the page includes specific color character images and a density setting process of setting the image density of black character images in the page according to the result of the mix determination process. This configuration makes it possible to maintain the original image density of black characters in a page where black and specific color character images are not mixed even if black and specific color character images are mixed in the color image as a whole. This in turn makes it possible to improve the readability of characters in the page.

The image processing device 100 of the copier of the third embodiment determines a combination of black character images and specific color character images in an original color image which have the same five character property values (character properties excluding color) and performs a process of reducing the image density of the black character images to a level lower than that of the specific color character images only for the determined combination. This configuration makes it possible to maintain the original image density of black characters even after monochrome conversion if the five character property values of specific color characters are different from those of the black characters and thereby makes it possible to improve the readability of the black characters.

In the copier of the third embodiment, "character size" may be used as one of the character properties excluding color. This configuration makes it possible to maintain the original image density of black characters even after monochrome conversion if the character size of specific color characters is different from that of the black characters and thereby makes it possible to improve the readability of the black characters.

In the copier of the third embodiment, "font" and/or "ON/OFF of italic" (i.e. typeface) may be used as one of the character properties excluding color. This configuration makes it possible to maintain the original image density of black characters even after monochrome conversion if the typeface of specific color characters is different from that of the black characters and thereby makes it possible to improve the readability of the black characters.

In the copier of the third embodiment, "ON/OFF of underline" (i.e. character decoration) may be used as one of the character properties excluding color. This configuration makes it possible to maintain the original image density of black characters even after monochrome conversion if the character decoration of specific color characters is different from that of the black characters and thereby makes it possible to improve the readability of the black characters.

In the copier of the third embodiment, "character thickness" may be used as one of the character properties excluding color. This configuration makes it possible to maintain the original image density of black characters even after monochrome conversion if the character thickness of specific color characters is different from that of the black characters and thereby makes it possible to improve the readability of the black characters.

An aspect of the present invention makes it possible to emphasize specific color characters in a color image even after the color image is converted into a monochrome image by making the image density of the color characters higher than the image density of black characters in the color image without changing the character properties excluding color of the specific color characters.

Aspects of the present invention provide an image processing device, an image processing method, an image forming apparatus, and a storage medium that make it possible to emphasize specific color characters in a color image even after monochrome conversion without changing the character properties excluding color of the specific color characters.

The present invention is not limited to the specifically disclosed embodiments, and variations and modifications may be made without departing from the scope of the present invention.

The present application is based on Japanese Priority Application No. 2008-005444, filed on Jan. 15, 2008, the entire contents of which are hereby incorporated herein by reference.

What is claimed is:

1. A device for converting a color image including multiple character images into a monochrome image, comprising:
   a color conversion unit configured to reduce the image density of black character images included in the color image to a level lower than the image density of specific color character images included in the color image and having a specific color other than black during the conversion of the color image into the monochrome image, and
   a character color mix determination unit configured to determine a combination of the black character images and the specific color character images in the color image which have the same character properties excluding color,
   wherein the color conversion unit is configured to perform a process of reducing the image density of the black character images to a level lower than the image density of the specific color character images only for the determined combination.

2. The device as claimed in claim 1, wherein a plurality of specific colors are preset in the device; and
   the color conversion unit is configured to reduce the image density of the black character images to a level lower than respective image density levels of the specific color character images having the specific colors.

3. The device as claimed in claim 1, wherein the specific color is red.

4. The device as claimed in claim 2, wherein one of the specific colors is red.

5. The device as claimed in claim 1, wherein:
   the character color mix determination unit is configured to determine whether the color image includes the specific color character images; and wherein
   if the specific color character images are not included in the color image, the color conversion unit is configured not to change the image density of the black character images in the color image during the conversion of the color image into the monochrome image.

6. The device as claimed in claim 5, wherein
   when the color image includes multiple pages to be formed by an image forming apparatus,
   the character color mix determination unit is configured to determine, page by page, whether the specific color character images are included in the color image; and
   the color conversion unit is configured to set the image density of the black character images, page by page, based on the determination result of the character color mix determination unit.

7. The device as claimed in claim 5, wherein the character properties excluding color includes character size.

8. The device as claimed in claim 5, wherein the character properties excluding color includes typeface.

9. The device as claimed in claim 5, wherein the character properties excluding color includes character decoration.

10. The device as claimed in claim 5, wherein the character properties excluding color includes character thickness.

11. An image forming apparatus, comprising:
    the device as claimed in claim 1 configured to convert a color image including multiple character images into a monochrome image; and
    an image forming unit configured to form an image on a recording medium according to data sent from the device.

12. A method of converting a color image including multiple character images into a monochrome image, comprising the step of:
    reducing the image density of black character images included in the color image to a level lower than the image density of specific color character images included in the color image and having a specific color other than black during the conversion of the color image into the monochrome image,
    determining a combination of the black character images and the specific color character images in the color image which have the same character properties excluding color, and
    reducing the image density of the black character images to a level lower than the image density of the specific color character images only for the determined combination.

13. A non-transitory machine-readable storage medium having program code embodied therein for causing a computer to function as a device for converting a color image including multiple character images into a monochrome image, the device comprising:
    a color conversion unit configured to reduce the image density of black character images included in the color image to a level lower than the image density of specific color character images included in the color image and having a specific color-other than black during the conversion of the color image into the monochrome image, and
    a character color mix determination unit configured to determine a combination of the black character images and the specific color character images in the color image which have the same character properties excluding color, the color conversion unit being configured to perform a process of reducing the image density of the black character images to a level lower than the image density of the specific color character images only for the determined combination.

* * * * *